United States Patent
Nogami et al.

(10) Patent No.: US 7,739,923 B2
(45) Date of Patent: Jun. 22, 2010

(54) TORQUE MEASURING METHOD AND APPARATUS FOR MOTOR-OPERATED VALVE

(75) Inventors: Takeki Nogami, Takamatsu (JP); Shigeya Yamaguchi, Takamatsu (JP)

(73) Assignee: Shikoku Research Institute Incorporated (JP)

( * ) Notice: Subject to any disclaimer, the term of this patent is extended or adjusted under 35 U.S.C. 154(b) by 291 days.

(21) Appl. No.: 11/921,760

(22) PCT Filed: Jun. 23, 2005

(86) PCT No.: PCT/JP2005/012012
§ 371 (c)(1), (2), (4) Date: Dec. 7, 2007

(87) PCT Pub. No.: WO2006/137169
PCT Pub. Date: Dec. 28, 2006

(65) Prior Publication Data
US 2009/0126511 A1    May 21, 2009

(51) Int. Cl.
*G01L 3/02* (2006.01)
(52) U.S. Cl. .................................. 73/862.31
(58) Field of Classification Search .............. 73/862.31; 702/34
See application file for complete search history.

(56) References Cited

U.S. PATENT DOCUMENTS

| 4,111,070 A | * | 9/1978 | Stratienko ..................... 74/625 |
| 4,130,030 A | * | 12/1978 | Stratienko ..................... 74/625 |
| 4,805,451 A | | 2/1989 | Leon ............................ 73/168 |
| 5,224,512 A | | 7/1993 | Nogami et al. ............... 137/554 |
| 5,594,175 A | | 1/1997 | Lyon et al. ..................... 73/593 |
| 5,836,567 A | * | 11/1998 | Watanabe .............. 251/129.12 |

FOREIGN PATENT DOCUMENTS

| JP | 05-172663 | 7/1993 |
| WO | WO 2004/081436 | 9/2004 |

* cited by examiner

*Primary Examiner*—Lisa M Caputo
*Assistant Examiner*—Octavia Davis
(74) *Attorney, Agent, or Firm*—Bacon & Thomas, PLLC

(57) ABSTRACT

A torque measuring method and apparatus for a motor-operated valve including a valve driving mechanism operable to open and close the valve, a worm displacable by driving of the motor to operate the valve driving mechanism, and a spring cartridge having a plurality of belleville springs and disposed coaxially with the worm for compression by the worm. The method comprises obtaining basic data representing a relationship between the amounts of compression of the belleville springs and the torques exerted, measuring a displacement of the worm or the spring cartridge and acquiring, from the thus obtained displacement of the worm or the spring cartridge, a real amount of compression of the belleville springs in which an influence of a play of the spring cartridge has been removed, and substituting the real amount of compression for the amount of compression of the basic data to acquire a real torque corresponding to the real amount of compression.

26 Claims, 8 Drawing Sheets

TORQUE MEASURING METHOD AND APPARATUS FOR MOTOR-OPERATED VALVE

TECHNICAL FIELD

The present invention relates to a torque measuring method for a motor-operated valve and to an apparatus suitable for carrying out the method.

BACKGROUND ART

Motor-operated valves, which are opened and closed by a driving force of a motor, have prominent features that a large driving force is available and that remote control can be adopted to open and close the valves. Thus, motor-operated valves are utilized in a variety of applications, such as large-scale plants in which a large-diameter piping system is installed or nuclear power plants in which a manual operation is not permitted. Motor-operated valves are generally used more to fully open or close a pipe in a piping system than to control the flow rate of a fluid.

Such a motor-operated valve has a valve disc for opening and closing a pipe in a piping system, a worm configured to be rotated by a motor, a valve driving mechanism which receives torque from the worm to drive the valve disc, and a spring cartridge having a plurality of belleville springs which are stacked and packed with a preload and which are compressible in proportion to a thrust from the worm. The torque of the motor is transmitted to the valve driving mechanism via the worm to drive the valve disc. When the amount of compression of the belleville spring pack reaches a limit, the motor is stopped to prevent an excessively large driving force from being exerted on the valve, so that the valve disc is prevented from being damaged.

In order to maintain the function of such a motor-operated valve over a long period of time, it is necessary to maintain the motor, worm, valve driving mechanism, valve disc and so on in good conditions. Examples of point to be checked include: whether the valve disc is driven by an appropriate torque, whether an appropriate retention torque is exerted on the valve disc when it is in the fully open or close position, whether the setting of a torque switch for automatically stopping the motor when a predetermined amount of torque is applied to the valve disc is appropriate, and how much the valve driving mechanism and so on are worn. Among these points, the points relating to torque are the most important in view of the fact that most failures of motor-operated valves are attributed to inappropriate torques. Thus, various methods for diagnosing the conditions of a motor-operated valve have been suggested.

For example, Japanese Patent No. 2,982,090 discloses a torque measuring method in which the displacement of a worm is regarded as being the amount of compression of belleville springs. Thus, a relationship between the displacement of the worm and the compression force exerted from the belleville springs is previously obtained. In measurement, the displacement of the worm is measured with a position sensor, and a compression force actually exerted from the belleville springs is obtained from the displacement using the previously obtained relationship. Then, the torque actually exerted on the valve driving mechanism from the worm is calculated from the compression force for the diagnosis of the conditions of the valve. According to this method, since the belleville springs are compressed regardless of whether the valve disc is shifted toward the open position or close position, a compression force (and corresponding torque) can be obtained by measuring the displacement of the worm. That is, by obtaining the relationship between the displacement of the worm and the torque in advance as basic data, the torque corresponding to a displacement of the worm can be obtained regardless of the operating direction of the valve disc.

SUMMARY OF THE INVENTION

The present inventors have found that the above method cannot precisely diagnose the torque-related valve conditions of the motor-operated valve.

In general, a plurality of belleville springs are alternately opposingly arranged and packed with a preload applied thereto to form a spring cartridge. The spring cartridge is placed between a pair of fixed, first and second restricting members. When the valve opening operation is conducted, one end of the spring cartridge is displaced with the other end being maintained in contact with the first restricting member, so that the belleville springs are compressed. When the valve closing operation is conducted, the other end of the spring cartridge is displaced with the one end being maintained in contact with the second restricting member, so that the belleville springs are also compressed.

In this case, the amount of compression of the belleville springs (or spring cartridge) may be determined by measuring the distance between a reference point and each end of the spring cartridge or a portion connected to thereto. In other words, the amount of compression of the spring cartridge may be determined by measuring an axial displacement of the worm or the spring cartridge. The relationship between the displacement of the worm and the amount of compression of the spring cartridge (which is related to torque) may be acquired from a torque curve representing a relationship between the displacement of the worm and torque during the opening and closing operations of the valve. FIG. 13 is an example of such a torque curve. A section C1 of the torque curve shown by the solid line is obtained by actual measurement of the torque and the displacement of the worm in the closing operation of the valve. When the section C1 is rotated by 180 degrees around a basic worm position "a", a section C2 representing a relationship between the torque and the displacement of the worm in the opening operation of the valve is obtained. The sections C1 and C2 constitute the torque curve with the worm position "a" being the center of symmetry. In FIG. 13, for easy understanding of the torque curve, the torque in the valve closing operation is shown as having plus values, while the torque in the valve opening operation is as having minus values.

It has been found that the diagnosis of the conditions of the valve using the torque curve shown in FIG. 13 may be accurate only when the axial length of the spring cartridge equals the distance between the first and second restricting members; i.e. so long as a play is not present when the spring cartridge is placed between the first and second restricting members. When such a play exists, the torque curve in the valve open operation is as indicated by C2'. Thus, the basic worm position "b" in the valve open operation is offset from the position "a" of the torque curve in the valve closing operation. In this case, the torque at a worm position "c" obtained by the torque curve C2 is T1, although the real torque should be T2 obtainable from the torque curve C2'. Thus, the measured torque T1 differs from the real torque T2 by a value (T2−T1). The diagnosis of the torque-related valve conditions, therefore, cannot be precise when the measured value T1 is used.

Thus, the object of the present invention is to provide torque measuring method and apparatus permitting precise diagnosis of torque-related conditions of a motor-operated valve.

In accordance with the present invention there is provided a torque measuring method for a motor-operated valve comprising a valve driving mechanism operable to open and close the valve, an axially extending and axially displaceable worm operatively connected to the valve driving mechanism to operate the valve driving mechanism by driving of the motor, and a spring cartridge having a plurality of axially arranged belleville springs applied with a preload so that the belleville springs operate as a unit, said spring cartridge being disposed coaxially with the worm for compression by axial displacement of the worm, so that a torque proportional to a compression of the belleville springs is applied to the driving mechanism upon an axial displacement of the worm, said method comprising the steps of:

(a) obtaining basic data representing a relationship between reference amounts of compression of the belleville springs of the spring cartridge and corresponding reference torques exerted by the reference amounts of compression;

(b) measuring an axial displacement of the worm or the spring cartridge and acquiring, from the thus obtained axial displacement of the worm or the spring cartridge, a real amount of compression of the belleville springs in which an influence of a play in the axial direction of the spring cartridge has been removed; and (c) substituting said real amount of compression of the belleville springs for the reference amount of compression of the belleville springs of said basic data to acquire a real torque corresponding to said real amount of compression.

According to the above torque measuring method, since the influence of a play in the axial displacement of the spring cartridge is removed, a real torque may be acquired from the basic data concerning the relationship between the amount of compression of the belleville springs of the spring cartridge and the torque exerted by the compression. Therefore, various torque-related conditions of the motor-operated valve can be precisely diagnosed by using the real torque.

The step (b) of the above torque measuring method may comprise measuring a first initial value representing a distance in the axial direction between a measuring point on the spring cartridge side and a reference point when the spring cartridge is located at a first initial position at which the spring cartridge has stopped moving when the valve is operated in the valve opening direction;

measuring a second initial value representing a distance in the axial direction between said measuring point and said reference point when the spring cartridge is located at a second initial position at which the spring cartridge has stopped moving when the valve is operated in the valve closing direction;

measuring a first measured value representing a distance in the axial direction between said measuring point and said reference point when the valve closing operation is conducted;

measuring a second measured value representing a distance in the axial direction between said measuring point and said reference point when the valve opening operation is conducted; and detecting the direction of the operation of the valve and acquiring said real amount of compression of the belleville springs, said real amount of compression equals an absolute value of a difference between said first measured value and said second initial value when the valve closing operation is conducted or an absolute value of a difference between said second measured value and said first initial value when the valve opening operation is conducted.

According to the above torque measuring method described immediately above, the reference torques and the first and second initial values are acquired in advance. Thus, at the time of measuring torque of the motor-operated valve, when only the first or second measured value and the operating direction of the valve disc are obtained, a real torque corresponding to the first or second measured value and free from the influence of the difference between the first and second initial values, that is, the play of the spring cartridge, can be easily obtained based on the basic data and the first and second initial values. When the real torque is compared with an appropriate torque for the target diagnosis item, a highly reliable diagnosis can be made, and, consequently, the operational reliability of the motor-operated valve can be improved. Also, since the torque measurement can be made when only the first or second measured value and the operating direction of the valve disc are obtained, the diagnosis can be made easily and quickly, resulting in a reduction in the diagnosis costs and, consequently, a reduction in the running costs of the motor-operated valve.

Alternatively, the step (b) of the above torque measuring method may comprise measuring a first initial value representing a distance in the axial direction between a measuring point on the spring cartridge side and a reference point when the spring cartridge is located at a first initial position at which the spring cartridge has stopped moving when the valve is operated in the valve opening direction;

measuring a second initial value representing a distance in the axial direction between said measuring point and said reference point when the spring cartridge is located at a second initial position at which the spring cartridge has stopped moving when the valve is operated in the valve closing direction;

calculating said play, said play equals an absolute value of a difference between said first initial value and said second initial value;

measuring a first measured value representing a distance in the axial direction between said measuring point and said reference point when the valve closing operation is conducted;

measuring a second measured value representing a distance in the axial direction between said measuring point and said reference point when the valve opening operation is conducted; and detecting the direction of the operation of the valve and acquiring said real amount of compression of the belleville springs, said real amount of compression equals an absolute value of a difference between said first measured value and said second initial value or a value obtained by subtracting said play from an absolute value of a difference between said first initial value and said first measured value when the valve closing operation is conducted, or equals a value obtained by subtracting said play from an absolute value of a difference between said second initial value and said second measured value or an absolute value of a difference between said second measured value and said first initial value when the valve opening operation is conducted.

According to the alternative method described immediately above, the reference torques, the first and second initial values, and the play which is represented as the absolute value of the difference between the first and second initial values, are acquired in advance. Thus, when only the first or second measured value and the operating direction of the valve disc are obtained, the real torque corresponding to the first or second measured value and free from the influence of the play can be easily obtained based on the basic data, the play and the first or second initial value. When the real torque is compared with an appropriate torque for the target diagnosis item, a highly reliable diagnosis can be made, and, consequently, the operational reliability of the motor-operated valve can be improved. In addition, since the changes of the difference between the first and second initial values, that is, the play of the spring cartridge, over time can be monitored, a multidimensional diagnosis can be made. Also, since the torque measurement can be made when only the first or second measured value and the operating direction of the valve disc are obtained, the diagnosis can be made easily and quickly, resulting in a reduction in the diagnosis costs and, consequently, a reduction in the running costs of the motor-operated valve.

In the step (a) of any of the torque measuring methods described above, the basic data may be obtained with the spring cartridge being detached from the motor-operated valve.

According to the above torque measuring method described immediately above, the basic data of the spring cartridge are obtained when the spring cartridge has been detached from the motor-operated valve. Thus, the basic data can be obtained easily and accurately as compared with the case in which the basic data are obtained with the spring cartridge being incorporated in the motor-operated valve. This enhances the reliability of the basic data and, consequently, improves the accuracy of the torque measurement for the motor-operated valve. When the basic data of a new spring cartridge are obtained in advance in preparation for the replacement of the old one, there is no need to obtain the basic data of the new spring cartridge again when the spring cartridges are replaced. This improves the efficiency in replacing spring cartridges and leads to a reduction in the torque measurement costs.

Alternatively, in the step (a) of any of the torque measuring methods described above, the basic data may obtained with the spring cartridge being mounted on the motor-operated valve.

According to the torque measuring method described immediately above, the basic data of the spring cartridge are obtained when the spring cartridge has been incorporated in the motor-operated valve. Thus, the basic data can be obtained easily and efficiently and the lowering of the rate of operation of the plant or the like in which the motor-operated valve is installed can be small as compared with the case in which the spring cartridge has to be detached from the motor-operated valve or the motor-operated valve has to be disassembled to obtain the basic data.

When the basic data is obtained with the spring cartridge being mounted on the motor-operated valve, the motor-operated valve may be in an inoperative state or in an operative state. In the former case, there is no need to isolate the motor-operated valve from other systems and there is no need for a power source for operating the motor-operated valve. Thus, the degree of freedom for the timing at which the basic data are obtained is large and the influence to the other operations can be minimized. In the latter case, the basic data can be obtained under conditions similar or close to the real operating conditions as compared with the former case.

In any of the torque measuring methods described above, the reference point is on a casing on which the motor-operated valve is secured.

According to the torque measuring method described immediately above, since the reference point is set on the casing of the motor-operated valve, which will not move regardless of whether the belleville springs are compressed or not, the reference point is not changed. Thus, since the first and second initial values and the first and second measured values can be measured with high accuracy, the accuracy of the measurement of a torque in the motor-operated valve is high.

Any of the torque measuring methods described above may additionally comprise using the real torque for diagnosing torque-related conditions of the motor-operated valve.

Since the torque can be measured with a high accuracy, various torque-related conditions of the motor-operated valve can be diagnosed with high accuracy and reliability.

In another aspect, the present invention provides a torque measuring apparatus for a motor-operated valve comprising a valve driving mechanism operable to open and close the valve, an axially extending and axially displaceable worm operatively connected to the valve driving mechanism to operate the valve driving mechanism by driving of the motor, and a spring cartridge having a plurality of axially arranged belleville springs applied with a predetermined load so that the belleville springs operate as a unit, said spring cartridge being disposed coaxially with the worm for compression by the worm, so that a torque proportional to a compression of the belleville springs is applied to the driving mechanism upon displacement of the worm, said apparatus comprising:

an acquisition device for acquiring basic data representing a relationship between reference amounts of compression of the belleville springs of the spring cartridge and corresponding reference torques exerted by the reference amounts of compression;

a real compression acquisition device for measuring an axial displacement of the worm or the spring cartridge and acquiring, from the thus obtained axial displacement of the worm or the spring cartridge, a real amount of compression of the belleville springs in which an influence of a play in the axial direction of the spring cartridge has been removed; and a computing device for acquiring a real torque corresponding to said real amount of compression by substituting said real amount of compression of the belleville springs for the reference amount of compression of the belleville springs of said basic data.

According to the above torque measuring apparatus, since the influence of a play in the axial displacement of the spring cartridge is removed, a real torque may be acquired from the basic data concerning the relationship between the amount of compression of the belleville springs of the spring cartridge and the torque exerted by the compression. Therefore, various torque-related conditions of the motor-operated valve can be precisely diagnosed by using the real torque.

In the torque measuring apparatus described above, the real compression acquisition device comprises a first, distance measuring device for measuring a first initial value representing a distance in the axial direction between a measuring point on the spring cartridge side and a reference point when the spring cartridge is located at a first initial position at which the spring cartridge has stopped moving when the valve is operated in the valve opening direction, and for measuring a second initial value representing a distance in the axial direction between said measuring point and said reference point when the spring cartridge is located at a second initial position at which the spring cartridge has stopped moving when the valve is operated in the valve closing direction;

a second, distance measuring device for measuring a first measured value representing a distance in the axial direction between said measuring point and said reference point when the valve closing operation is conducted, and for measuring a second measured value representing a distance in the axial direction between said measuring point and said reference point when the valve opening operation is conducted;

a detector for detecting the direction of the operation of the valve; and a computing device for acquiring said real amount of compression of the belleville springs, said real amount of compression equals an absolute value of a difference between said first measured value and said second initial value when the valve closing operation is conducted or an absolute value of a difference between said second measured value and said first initial value when the valve opening operation is conducted.

According to the torque measuring apparatus described immediately above, the basic data acquisition device and the first, distance measuring device acquire the reference torques and the first and second initial values, respectively, in advance. Thus, when the second, distance measuring device acquires the first or second measured value and the detector detects the operating direction of the valve disc, the computing device can obtain a real torque corresponding to the first or second measured value and free from the influence of the difference between the first and second initial values, that is, the play of the spring cartridge, easily and reliably based on the basic data obtained from the acquisition device and the first or second initial value. This contributes to the improvement of the operational reliability of the motor-operated valve. Further, since the torque can be measured when the second, distance measuring device acquires the first or second measured value and when the detector detects the operating direction of the valve disc, the torque measurement costs and the running costs of the motor-operated valve may be significantly reduced.

Alternatively, in the torque measuring apparatus described above, the measuring device comprises a first, distance measuring device for measuring a first initial value representing a distance in the axial direction between a measuring point on the spring cartridge and a reference point when the spring cartridge is located at a first initial position at which the spring cartridge has stopped moving when the valve is operated in the valve opening direction, and for measuring a second initial value representing a distance in the axial direction between said measuring point and said reference point when the spring cartridge is located at a second initial position where the spring cartridge stops moving when the valve is operated in the valve closing direction;

a calculator for calculating said play, said play equals an absolute value of a difference between said first initial value and said second initial value;

a second, distance measuring device for measuring a first measured value representing a distance in the axial direction between said measuring point and said reference point when the valve closing operation is conducted, and for measuring a second measured value representing a distance in the axial direction between said measuring point and said reference point when the valve opening operation is conducted;

a detector for detecting the direction of the operation of the valve; and a computing device for acquiring said real amount of compression of the belleville springs, said real amount of compression equals a difference between said first measured value and said second initial value or a value obtained by subtracting said play from an absolute value of a difference between said first initial value and said first measured value when the valve closing operation is conducted, or equals a value obtained by subtracting said play from an absolute value of a difference between said second initial value and said second measured value or an absolute value of a difference between said second measured value and said first initial value when the valve opening operation is conducted.

In the above alternative embodiment, the basic data acquisition device, the first, distance measuring device, and the calculator acquire the reference torques, the first and second initial values, and the play which is represented as the absolute value of the difference between the first and second initial values, respectively, in advance. Thus, when the second, distance measuring device acquires the first or second measured value and the detector detects the operating direction of the valve disc, the computing device can obtain a real torque corresponding to the first or second measured value and free from the influence of the play of the spring cartridge easily and reliably based on the basic data and the play obtained from the acquisition device and the first or second initial value. This contributes the improvement of the operational reliability of the motor-operated valve. In addition, the changes of the difference between the first and second initial values, that is, the play of the spring cartridge, over time can be monitored. Further, since the torque can be measured when the second, distance measuring device acquires the first or second measured value and when the detector detects the operating direction of the valve disc, the torque measurement costs and the running costs of the motor-operated valve may be significantly reduced.

In any of the torque measuring apparatus described above, the first and second distance measuring devices may be common to each other.

According to the torque measuring apparatus described immediately above, since the first, distance measuring device is also used commonly as the second, distance measuring device, structure of the torque measuring apparatus can be simplified and the number of parts is reduced. Therefore, the apparatus costs can be reduced as compared with the case in which the apparatus has two, separate measuring devices.

In the embodiment described immediately above, the distance measuring device may comprise a laser sensor configured to receive a laser beam reflected on the measuring point on the spring cartridge to detect a distance from the laser sensor to the measuring point.

According to the torque measuring apparatus described immediately above, the distance measuring comprises a laser sensor which receives a laser beam reflected on the measuring point on the spring cartridge to measure the distance to the measuring point. Thus, the first and second distance measuring devices can be more compact in size as compared with the case in which the first and second, distance measuring devices are constituted of differential transformers, and, consequently, the entire torque measuring apparatus can be compact in size. In addition, since the laser sensor is compact in size, it can be permanently installed in the motor-operate valve, and the apparatus costs can be reduced as compared with the case in which such measuring device has to be attached to the motor-operated valve every time a torque measurement has to be made.

The laser sensor may be oil-tightly separated from the spring cartridge by a transparent member such that the laser sensor receives the reflected laser beam through the transparent member.

According to the torque measuring apparatus described immediately above, the laser sensor and the spring cartridge are oil-tightly separated from each other by the transparent member and the laser sensor is opposed to the measuring point through the transparent member. Thus, when the laser sensor, which functions as the first and second measuring devices, is permanently installed in the motor-operated valve, a lubricating oil on the side of the motor-operated valve is prevented from leaking to the side of the laser sensor and from contaminating the laser sensor. Thus, the function of the laser sensor can be maintained over a long period of time. As a result, the laser sensor can have long service life and perform reliable measurement.

In any of the torque measuring apparatus described above, the torque measuring apparatus may comprise a diagnosing device electrically connected to the computing device for diagnosing torque-related conditions of the motor-operated valve using said real torque.

Since the diagnosing device receives the real torque data from the computing device, the torque measuring apparatus permits a highly reliable diagnosis.

In this case, the torque measuring apparatus may further comprise a display device electrically connected to the diagnosing device for displaying a torque curve.

Since the results of diagnosis are displayed on the display device, easy and accurate recognition of the results can be made. Further, since a torque curve may be also displayed, the existence of a play and the size thereof can be realized easily and accurately from the torque curve.

BRIEF DESCRIPTION OF THE DRAWINGS

The present invention will be described in more detail with reference to the accompanying drawings, in which.

DETAILED DESCRIPTION OF THE PREFERRED EMBODIMENTS

Figure 1:
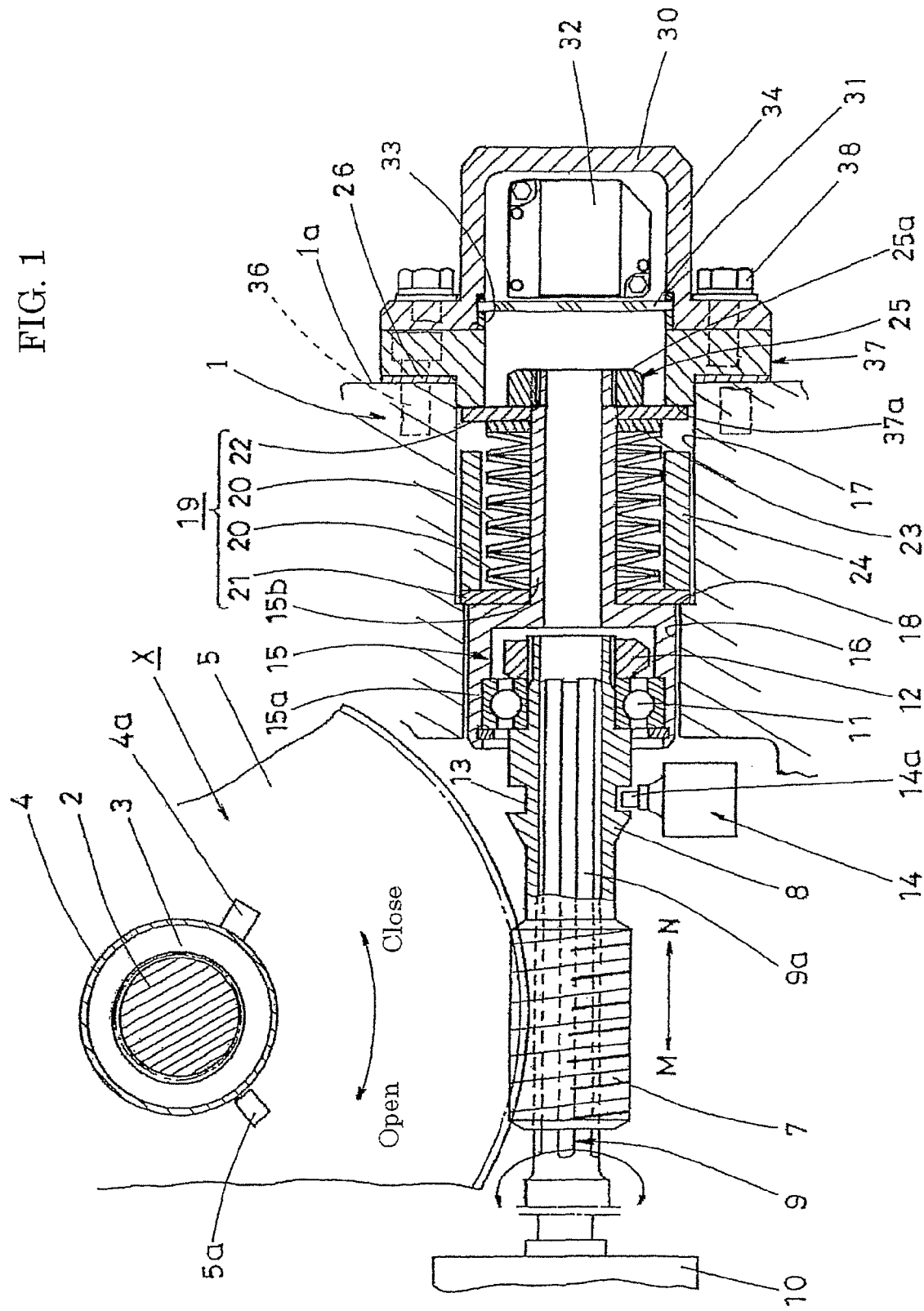
FIG. 1 is a cross-sectional view diagrammatically illustrating an essential part of a motor-operated valve into which a torque measuring apparatus according to the present invention is incorporated.

FIG. 1 illustrates a motor-operated valve provided with a torque measuring apparatus according to the present invention. The motor-operated valve has a valve stem 2 having upper and lower ends, and a valve disc (not shown) connected to the lower end of the valve stem 2 and shiftable in a passage through a pipe between open and close positions to open and close the passage. The valve stem 2 has a threaded portion at its upper end, with which a stem nut 3 is threadingly engaged. The valve stem 2 is movable in its axial direction but cannot be rotated. The stem nut 3 is fitted in a cylindrical drive sleeve 4 and integrated for rotation therewith. A worm wheel 5 is mounted on the drive sleeve 4 and is rotatable relative thereto. The worm wheel 5 has a projection (or lug) 5a, while the drive sleeve 4 has a projection (or key) 4a.

When the worm wheel 5 is rotated, the projection 5a of the worm wheel 5 is brought into engagement with the projection 4a of the drive sleeve 4 so that the drive sleeve 4 (that is, the stem nut 3) is rotated together with the worm wheel 5. Then, the torque of the stem nut 3 is transmitted to the valve stem 2 as a displacing force in the axial direction thereof to move up or down the valve disc. The above-described parts such as worm wheel 5, the stem nut 3, and the valve stem 2 constitute a valve driving mechanism generally indicated as X.

The valve driving mechanism is actuated by driving of a motor 10 through a worm 7 which is in meshing engagement with the worm wheel 5. When the worm 7 is driven to rotate by the motor 10, the worm wheel 5 is rotated and the torque of the worm wheel 5 is transmitted via the stem nut 3 to the valve stem 2 as a driving force to move it up or down.

The motor 10, which is a reversible motor, is secured to a casing or frame 1 and has a motor shaft 9 with splines 9a on a periphery thereof. The worm 7 is in spline engaged with the motor shaft 9, so that the worm 7 is rotated by the driving of the motor shaft 9 and is also displaceable axially (in the directions indicated by the arrows M and N) on the motor shaft 9. The above construction of the motor-operated valve is conventionally known.

The worm 7 has an extended cylindrical portion 8 extending from one end thereof. The extended cylindrical portion 8 has a circumferential groove 13 in its exterior surface, and an operation element 14a of a torque switch 14 is positioned in the circumferential groove 13. The torque switch 14 is actuated and outputs a stop signal to stop the motor 10 when the worm 7 is axially displaced from its neutral position to a position where the displacement of the worm 7 reaches a predetermined value, thereby preventing the transmission of excessive torque to the valve stem 2 and protecting the valve stem from damage.

The extended cylindrical portion 8 of the worm 7 has an end portion to which a bearing 11 is fixedly secured by a nut 12. An axially movable shaft 15 is secured to the bearing 11 such that the worm 7 is rotatable relative to the movable shaft 15. The movable shaft 15 has a large-diameter cylindrical portion 15a, in which the bearing 11 is secured, and a small-diameter cylindrical portion 15b extending from the large-diameter cylindrical portion 15a. As a consequence of the above construction, the shaft 15 is axially displaceable together with the worm 7.

Mounted on the small-diameter cylindrical portion 15b of the movable shaft 15 is a spring cartridge 19. The spring cartridge 19, which is adapted to apply a desired retention torque to the worm wheel 5 via the worm 7 after the valve disc has been shifted to the fully open or close position, has a first spacer 21 located on the side of a step between the large-diameter cylindrical portion 15a and the small-diameter cylindrical portion 15b, and a second spacer 22 located on the side of a seat of a nut 25 threaded on an end portion of the small-diameter cylindrical portion 15b. A plurality of belleville springs or disc springs 20 are stacked between the first and second spacers 21 and 22 such that their front and reverse sides are alternately oriented in opposite directions. A preload is applied to the belleville springs so that the belleville springs operate as a unit. Designated as 23 is a shim for adjusting the preload on the belleville springs 20, and as 24 is a torque limit sleeve for limiting the compression of the belleville springs 20.

The spring cartridge 19 whose dimension in a free state (that is, the external distance between the first and second spacers 21 and 22 in the state where the preload is applied to the spring cartridge 19) is held constant is placed between the step portion between the large-diameter cylindrical portion 15a and the small-diameter cylindrical portion 15b of the movable shaft 15 and the seat of the nut 25. The free state of the spring cartridge 19 will be hereinafter referred to as "initial state," and the compressed state of the belleville springs 20 in the initial state will be hereinafter referred to as "initial compressed state."

The movable shaft 15 is fitted in a bore formed in the casing 1 coaxially with the worm 7. The bore has a small-diameter hole 16 in which the large-diameter cylindrical portion 15a of the movable shaft 15 is received and a large-diameter hole 17 which coaxially extends from the small-diameter hole 16 and in which the spring cartridge 19 is fitted. The movable shaft 15 is axially displaceable in the small-diameter hole 16, and the spring cartridge 19 is compressed and expanded in the large-diameter hole 17. A shoulder or step 18 between the small-diameter hole 16 and the large-diameter hole 17 is configured to inhibit the first spacer 21 of the spring cartridge 19 from moving beyond it in the direction indicated by the arrow M.

A flanged cylindrical adapter 37 is joined to the end of the large-diameter hole 17 in a socket-and-spigot joint fashion and secured to an end face 1a of the casing 1 by bolts 36 with a packing 26 interposed therebetween. A hereinafter described sensor unit 30 is attached to an outer end of the adapter 37 by bolts 38. The sensor unit 30 has a bottomed and flanged cylindrical sensor holder 34 secured to the outer end of the adapter 37. A plate-like transparent member 31 is attached to the sensor holder 34 with a seal packing 33 therebetween such that it axially divides the space defined by the adapter 37 and the sensor holder 34 into two sections. The spaces on both sides of the transparent member 31 are oil-tightly separated from each other by the transparent member 31. The transparent member 31 is made of an oil-resistant, transparent material such as a glass plate or an acrylic plate.

The nut 25 is located in the space on the side of the adapter 37, and a laser sensor 32 is located in the space on the side of the sensor holder 34. The laser sensor 32, which constitutes the "first, distance measuring device" and the "second, distance measuring device" referred to in the appended claims, is opposed to the nut 25 attached to the end of the movable shaft 15 through the transparent member 31 and measures the axial position of the worm 7 by measuring the position of the nut 25. More specifically, the laser sensor 32 measures the distance (interval) from it to a "measuring point" set on a top face 25a of the nut 25.

Since the laser sensor 32 is oil-tightly separated from the side of the spring cartridge 19 by the transparent member 31 as described above, lubricating oil which exists on the side of the motor-operated valve cannot leak to the side of the laser sensor 32 and contaminate the laser sensor 32 even when the laser sensor 32 is permanently installed in the vicinity of the motor-operated valve. This improves the service life of the laser sensor 32 and ensures reliable measurement by the laser sensor 32. A cover 34 is attached to the outside of the adapter 37, and the laser sensor 32 is covered with and protected by the cover 34.

In the illustrated embodiment, the laser sensor 32 may perform a part of the function of the "acquisition device for acquiring basic data" referred to in the claims as well as the functions of the "first, distance measuring device" and the "second, distance measuring device" referred to in the claims. More specifically, the laser sensor 32 may constitute a part of means for detecting reference amounts of compression of the belleville springs 20 in the spring cartridge 19. Thus, a distortion sensor (not shown), calibrated by some means, for detecting reference compression forces which are generated in correspondence with the reference amounts of compression of the belleville springs 20 is provided on the side of the adapter 34. A plurality of such distortion sensors may be provided on a plurality of parts of the motor-operated valve such as the spring cartridge, stem and yoke. In this case, when the correlation among the distortion sensors is known, the reference compression forces can be detected by any of the distortion sensors.

Figure 2:
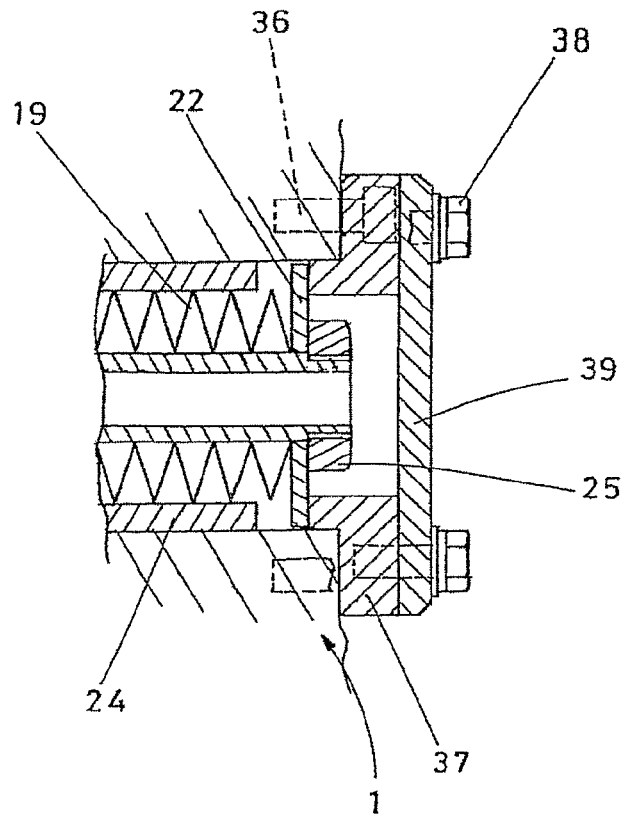
FIG. 2 is a partial cross-sectional view diagrammatically illustrating an adapter of the motor-operated valve shown in FIG. 1, to which a cap is attached instead of a sensor unit.

The sensor unit 30, which is compact in size, can be permanently attached to the casing 1. In this case, the sensor unit 30 can constantly perform measurement as discussed later. When the sensor unit 30 is detachable so that it can be used for another motor-operated valve, a cap 39 is attached in place of the sensor unit 30 as shown in FIG. 2 when the sensor unit 30 is not attached. That is, only the adapter 37 is permanently attached to the casing 1, and the cap 39, an external torque sensor or the like can be attached to the adapter 37 as needed.

Description will be made of the operations of the motor-operated valve and the sensor unit 30.

When the motor-operated valve is fully closed from the fully open position, the worm 7 is rotated by driving of the motor 10 in such a direction that the valve disc is shifted in the valve closing direction. When the worm 7 is rotated, the worm wheel 5 which is in meshing engagement with the worm 7 is rotated. Then, when the projection 5a of the worm wheel 5 is brought into engagement with the projection 4a of the drive sleeve 4, the drive sleeve 4 and the stem nut 3 are rotated together with the worm wheel 5. By the rotation of the stem nut 3, the valve stem 2 is moved down and the valve disc is shifted in the valve closing direction. When the valve disc is moving toward the close position, no load is applied to the valve stem 2 so that the worm 7 is rotated but does not receive a thrust in the axial direction. Thus, the spring cartridge 19 is kept in the initial state.

When the valve disc abuts against a valve seat (not shown), since the valve disc cannot be further moved down, rotational resistance is exerted on the worm wheel 5 and an axial thrust is applied to the worm 7. The thrust applied to the worm 7 is transmitted to the first spacer 21 of the spring cartridge 19 via the bearing 11 and the movable shaft 15, and the spring cartridge 19 is urged in the direction indicated by the arrow N. At this time, since the second spacer 22 at the other end of the spring cartridge 19 is in contact with the end face 37a of the adapter 37 and cannot be moved, a compression force is applied to the belleville springs 20 of the spring cartridge 19.

However, the belleville springs 20 in the spring cartridge 19 have been compressed by a preload and are stiff, the belleville springs 20 are not compressed but maintained in the initial compressed state until the thrust becomes equal to the preload. Thus, the spring cartridge 19 is maintained in the initial state. When the thrust applied from the worm 7 to the spring cartridge 19 exceeds the preload, the belleville springs 20 are compressed from the initial compressed state and the worm 7 is moved in the direction indicated by the arrow N. When the displacement of the worm 7 (that is, the amount of compression of the belleville springs 20) reaches a predetermined value, the torque switch 14 is activated to stop the motor 10. Thus, an excess torque is prevented from being applied to the valve disc so that the valve is protected from damage. The valve disc is pressed against the valve seat by the torque applied thereto during this period (that is, the period from when the valve disc abuts against the valve seat until the torque switch 14 is activated to stop the motor 10), and a good seal is thereby formed between the valve disc and the valve seat.

The operation at the time the motor-operated valve is opened from the fully close position is the same as the operation at the time when the motor-operated valve is closed from the fully open position except that the direction in which the worm 7 is moved and the direction in which the belleville springs 20 in the spring cartridge 19 are compressed are opposite, and hence its description is omitted. When the valve is operated in the valve opening direction, the belleville springs 20 receive a thrust in the direction indicated by the arrow M from the nut 25 since the belleville springs 20 are constrained by the shoulder 18.

As described above, in the motor-operated valve, the application of additional torque to the worm wheel 5 after the valve disc has been shifted to the fully open or close position is important to hold the valve disc in the fully open position and to ensure that a good seal is formed when the valve disc is in the fully close position. Thus, to ensure that an appropriate torque is always applied to the worm wheel 5, it is very important to measure and diagnose the torque applied to the worm wheel 5. In this embodiment, a torque measuring apparatus having the sensor unit 30 as a constituent component is provided to ensure that an appropriate torque is always applied to the worm wheel 5.

If desired, a linear variable differential transformer may be used as a position sensor in lieu of the laser sensor 32. The linear variable differential transformer has two secondary coils placed symmetrically on either side of a primary coil and a magnetic core inserted through the coils. Movement of the magnetic core under excitation of the primary coil causes the mutual inductance of each secondary coil to vary relative to the primary coil. Thus, the relative voltage induced from the primary coil to the secondary coil will vary as well. As a consequence of the above construction, the differential transformer produces an electrical output proportional to the displacement of the core. When the core is configured to be axially displaceable following a compression displacement of the spring cartridge, the displacement of the worm (namely, compression amount of the spring cartridge) can be determined on the basis of the voltage induced on the secondary coil side of the differential transformer.

The constitution of the torque measuring apparatus and the torque measuring method using the apparatus will be described in detail below.

The fundamental principles of the torque measuring method according to the present invention will be first described.

The torque "T" applied to the worm wheel 5 is represented by the product of the compression force "f" exerted from the belleville springs 20 which act as resistance to the motion of the worm 7 and the distance "r" between the worm 7 and the axis of the worm wheel 5 ($T=f \times r$). The belleville springs 20 have intrinsic spring properties, and there is a correlation between the amount of compression of the belleville springs 20 and the compression force generated by the compressed belleville springs 20. Thus, the magnitude of the torque applied to the worm wheel 5 can be indirectly acquired by obtaining the amount of compression of the belleville springs 20.

Thus, in the present invention, a relationship between the amount of compression of the belleville springs 20 and the compression force exerted from the springs 20, and a relationship between the compression force exerted from the spring pack and the torque applied to the driving mechanism are acquired in advance as basic data. For example, the spring properties of the belleville springs 20, that is, reference amounts of compression La1, La2, ..., and Lan, and reference compression forces F1, F2, ..., and Fn corresponding to the reference amounts of compression La1, La2, ..., and Lan, respectively, and reference torques T1, T2, ..., and Tn calculated based on the reference compression forces F1, F2, ... and Fn, respectively, are acquired in advance as basic data as shown in Table 1 below.

TABLE 1

| Reference amounts of compression | La1 | La2 | La3 | ... | Lan |
|---|---|---|---|---|---|
| Reference compression forces | F1 | F2 | F3 | ... | Fn |
| Reference torque | T1 | T2 | T3 | ... | Tn |

In the torque measurement, the amount of compression of the belleville springs 20 in a given valve condition is first measured. The measured value is substituted for a reference amount of compression using the basic data, and a reference torque is obtained based on the reference amount of compression using the basic data. In diagnosis, the thus obtained reference torque is compared with an appropriate torque determined in advance for each diagnostic item to determine whether the obtained reference torque is within an appropriate range. This is the first fundamental principle of the torque measuring method of the present invention. Although the basic data are shown in a data table in this embodiment, the basic data may be displayed by any suitable way. For example, the basic data may be displayed in graphs showing a relationship between the compression amounts and the compression forces and a relationship between the compression forces and torques.

When the torque measurement for the motor-operated valve is made based on the "first fundamental principle" by measuring the current amount of compression of the belleville springs 20 and by obtaining reference torque corresponding to the reference amount of compression substituted with the measured amount of compression using the basic data, the current amount of compression of the belleville springs 20 is desired to be measured when the spring cartridge 19 has been incorporated in the motor-operated valve. However, it is difficult to measure the amount of compression of the belleville springs 20 directly because of the arrangement structure of the spring cartridge 19. Thus, there is no other convenient choice but to measure the axial position of a measuring point on the spring cartridge side with a position sensor such as the laser sensor 32 located in a position on the axis of the spring cartridge 19 and to regard the displacement of the measuring point as the amount of compression of the belleville springs 20 as described before.

The spring cartridge 19, in the initial state, is disposed in the space between the shoulder 18 of the large-diameter portion 17 on the side of the casing 1 and the end face 37a of the adapter 37 of the sensor unit 30 joined to an end of the large-diameter portion 17 as shown in FIG. 1. Thus, when the axial dimension of the space equals the axial dimension of the spring cartridge 19 in the initial state (that is, there is no play in the axial direction), the displacement of the measuring point on the spring cartridge side can be employed as the amount of compression of the belleville springs 20 as it is.

In reality, however, such a play is unavoidably present due to manufacturing errors or assembly errors. Thus, when the measured displacement is employed as the amount of compression of the belleville springs 20, the amount of compression includes the play. Namely, when the measured amount of compression of the belleville springs 20 is substituted as such for a reference amount of compression in the basic data and a reference torque corresponding to the reference amount of compression is obtained, a high degree of accuracy cannot be expected in the measurement of torque, since there is an error between the reference torque and the torque actually applied to the worm wheel 5.

Figure 10:
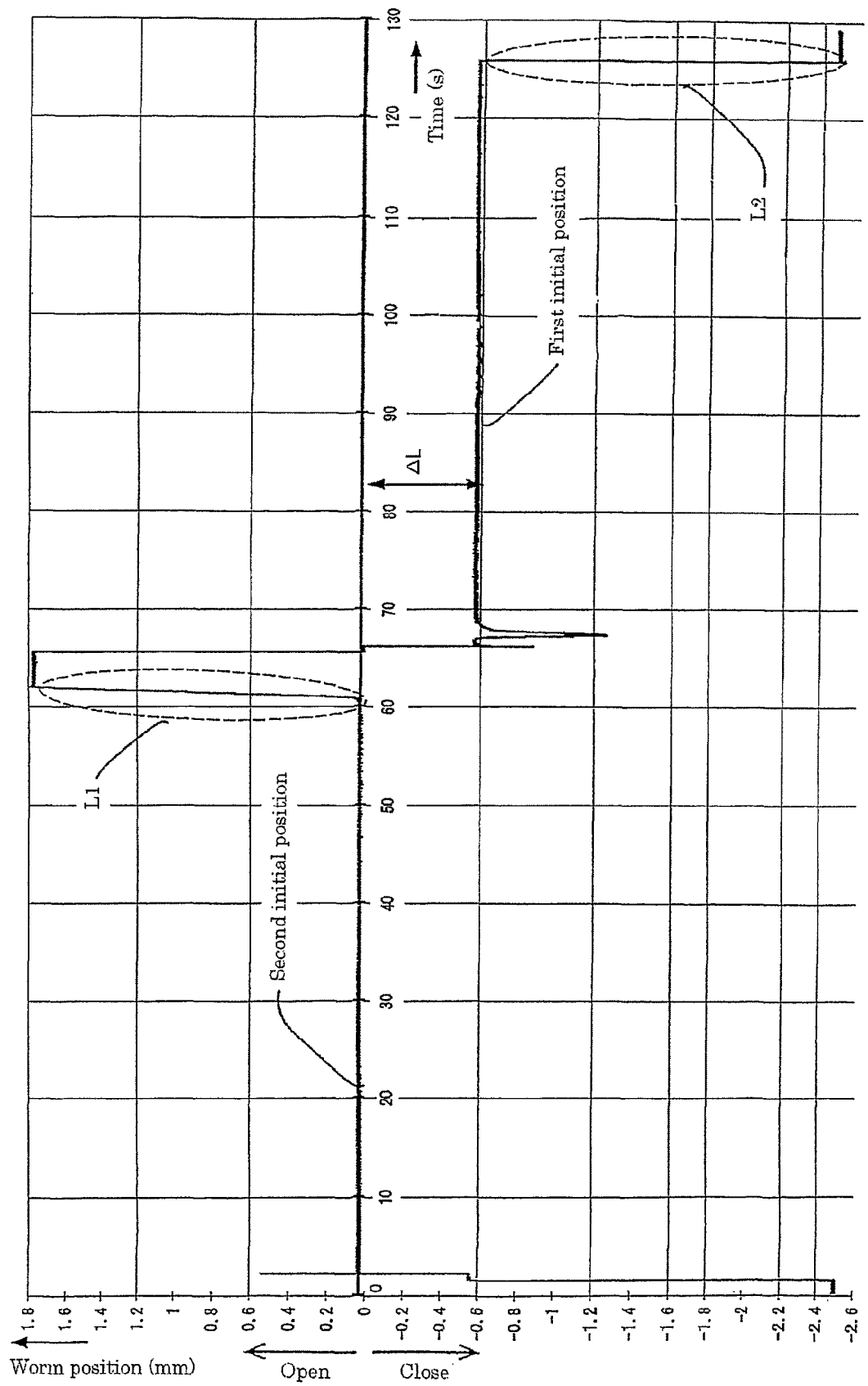
FIG. 10 is a graph showing data of an experiment for detecting the play of a spring cartridge.

FIG. 10 shows experimental data on the changes of the worm position with time measured when a motor-operated valve is opened and closed. In this experiment, the real amount of compression is about 1.7 mm (L1) for the closing direction and about 1.9 mm (L2) for the opening direction. Since the play ($\Delta L$) is 0.6 mm, when the second initial position (discussed later) is regarded as the original position of the worm, the ratio of the play to the real amount of compression in the opening direction is about 32% (0.6/1.9×100). Thus, when the torque measurement is made based on the basic data and the worm displacement, an error of about 32% may be introduced unless the play is taken into account. An error of about 32% is large in view of the fact that the criteria in making torque measurement which is applied when the torque switch is actuated by the displacement of the worm and the motor driving power is turned off is ±10%.

Thus, the play is measured prior to the torque measurement. Then, in torque measurement, a "real amount of compression" of the belleville springs 20 is obtained by subtracting the play from the measurement. The real amount of compression is substituted for a reference amount of compression in the basic data, and a reference torque corresponding to the reference amount of compression is obtained as the real torque applied to the worm wheel 5. This is the second fundamental principle of the torque measuring method according to the present invention.

As described above, the torque measuring method of the present invention is based on the "first fundamental principle" and the "second fundamental principle" for the purpose of making accurate measurement and reliable evaluation.

The greater the number of samples (n), the higher the reliability of the basic data will be. However, when sampling is carried out at appropriate intervals and interpolation is made between the samples by an appropriate method, the basic data file can be compact in size. The simplest form of interpolation is connecting adjacent points with straight lines. This method is suitable when the spring constant of the belleville springs 20 is considered linear. When the spring constant of the belleville springs 20 is not considered linear, the moving average method or least square approximation method can be used.

The method for obtaining the basic data is as follows. The items of the basic data are reference amount of compression, reference compression force, and reference torque as shown in the above Table 1. The reference amount of compression and the reference compression force are obtained by measurement. As described before, the measurement may be made using the laser sensor 32 when the spring cartridge 19 has been incorporated in the motor-operated valve or when the spring cartridge 19 has been detached from the motor-operated valve as described before. In the latter case, pressures are directly applied to the spring cartridge 19 with pressing means to compress it, and the amounts of compression corresponding to the applied pressures are obtained as reference amounts of compression and the generated compression forces are obtained as reference compression forces with a distortion sensor or the like. In this case, the problem of "play" does not occur. In the former case, however, it is necessary to exclude the play of the spring cartridge 19 from the measurements and employ the real amounts of compression of the spring cartridge 19 as the "reference amounts of compression." In obtaining the basic data, each measurement is preferably performed at least twice in view of the fluctuations of measurements caused by the reproducibility of the compression properties of the belleville springs 20 of the spring cartridge 19.

The torque measuring method and apparatus of the present invention will be described in detail below.

First, the behavior of the spring cartridge 19 at the time when it is compressed and the method for obtaining positional information which changes along with the compression of the spring cartridge 19 will be described with reference to the schematic views of FIGS. 5 to 8. Here, the description will be made on the premise that there is a play "$\Delta L$" in the installation space for the spring cartridge 19, that is, between the axial distance from the shoulder 18 of the casing 1 to the end face 37a of the adapter 37 and the length of the spring cartridge 19 in the initial state.

Figure 5:
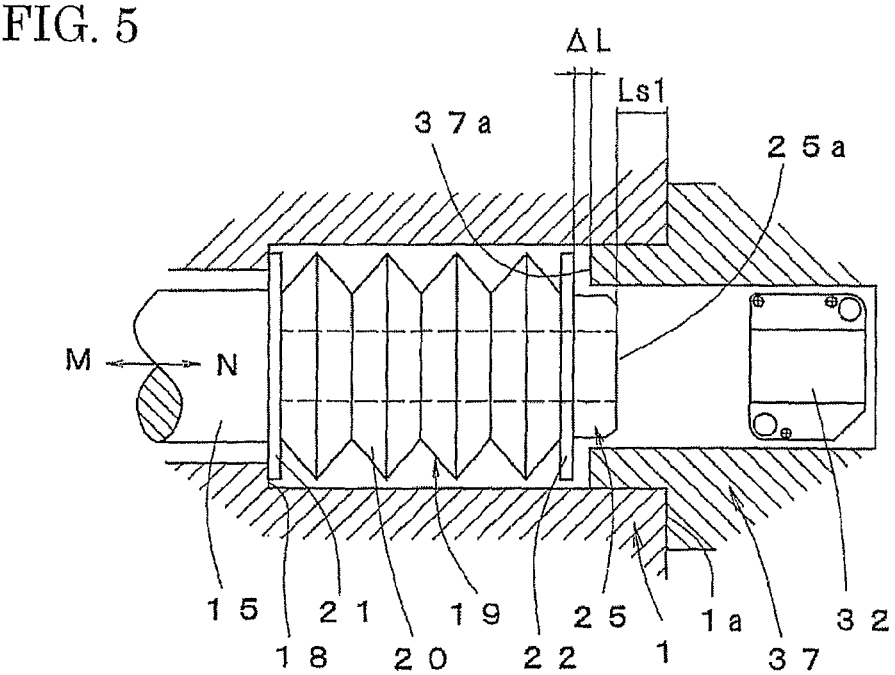
FIG. 5 is a partial cross-sectional view diagrammatically illustrating the state of the spring cartridge of FIG. 1 in its first initial position.
Figure 6:
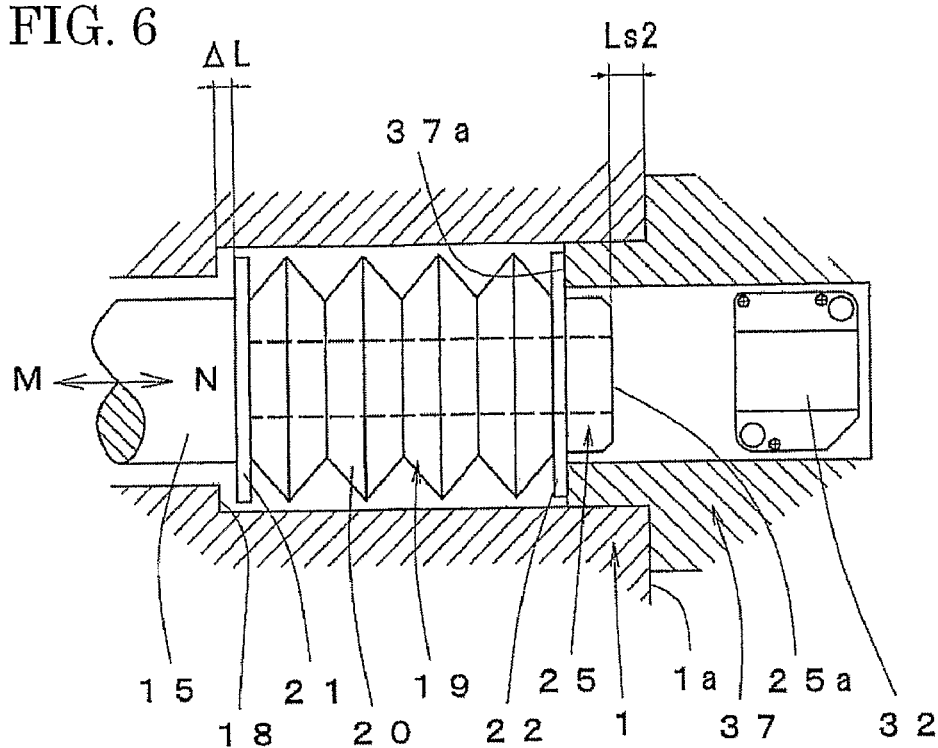
FIG. 6 is a partial cross-sectional view, similar to FIG. 5, diagrammatically illustrating the state of the spring cartridge in its second initial position.

When there is a play $\Delta L$, the compression of the spring cartridge 19 is started from a state in which the spring cartridge 19 has been shifted, with its initial state maintained, to a position (this position will be hereinafter referred to as "first initial position") where the first spacer 21 at one end of the spring cartridge 19 is brought into engagement with the shoulder 18 and cannot go further in the direction indicated by the arrow M (that is, the valve opening direction) as shown in FIG. 5 or from a state in which the spring cartridge 19 has been shifted, with its initial state maintained, to a position (this position will be hereinafter referred to as "second initial position") where the second spacer 22 at the other end of the spring cartridge 19 is brought into engagement with the end face 37a of the adapter 37 and cannot go further in the direction indicated by the arrow N (that is, the valve closing direction) as shown in FIG. 6. The compression of the spring cartridge 19 may be started from a state in which the spring cartridge 19 is in an intermediate position between the first and second initial positions in reality. In such a case, however, since the spring cartridge 19 cannot be compressed without coming to either the first or second initial position, there is no need for taking the compression from an intermediate state into account. When the spring cartridge 19 is in the first initial position, the play $\Delta L$ appears as a gap between the outer side of the second spacer 22 and the end face 37a of the adapter 37. When the spring cartridge 19 is in the second initial position, the play $\Delta L$ appears as a gap between the outer side of the first spacer 21 and the shoulder 18.

Figure 7:
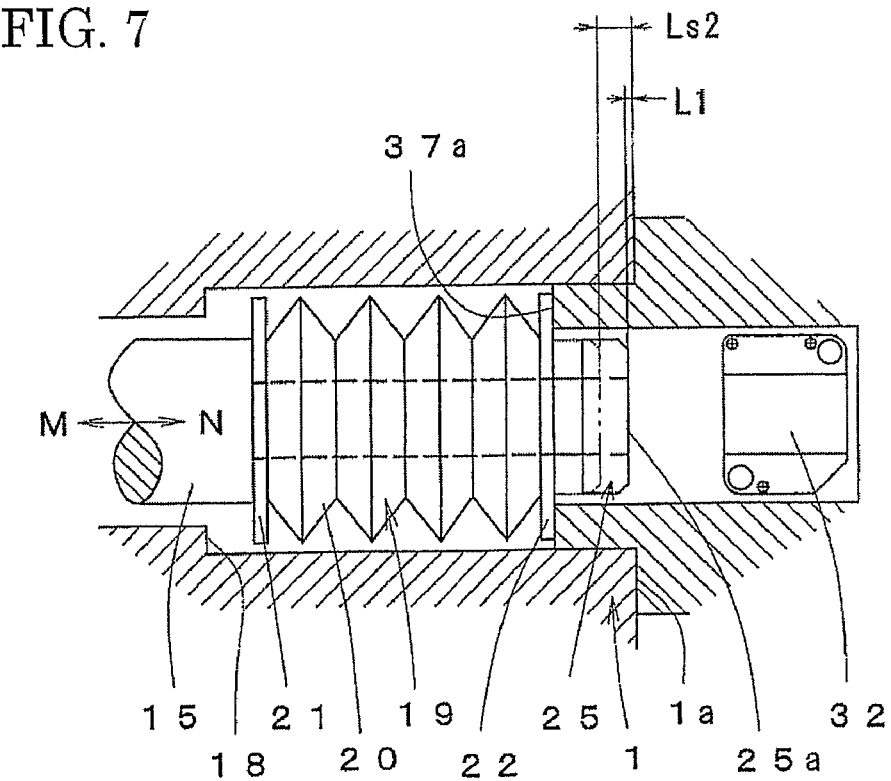
FIG. 7 is a partial cross-sectional view, similar to FIG. 5, diagrammatically illustrating a compressed state of the spring cartridge in a valve closing operation.

FIG. 7 shows a state of the spring cartridge 19 at the time when the valve closing operation is conducted and the spring cartridge 19 is compressed in the direction indicated by the arrow N after the spacer 22 has been brought into engagement with the end face 37a of the adapter 37. In this case, when the valve closing operation is started from the state where the spring cartridge 19 is in the first initial position, the spring cartridge 19 is moved from the first initial position to the second initial position and then brought into the state shown in FIG. 7. When the valve closing operation is started from the state where the spring cartridge 19 is in the second initial position, the spring cartridge 19 is brought into the state shown in FIG. 7 directly from the second initial position.

Figure 8:
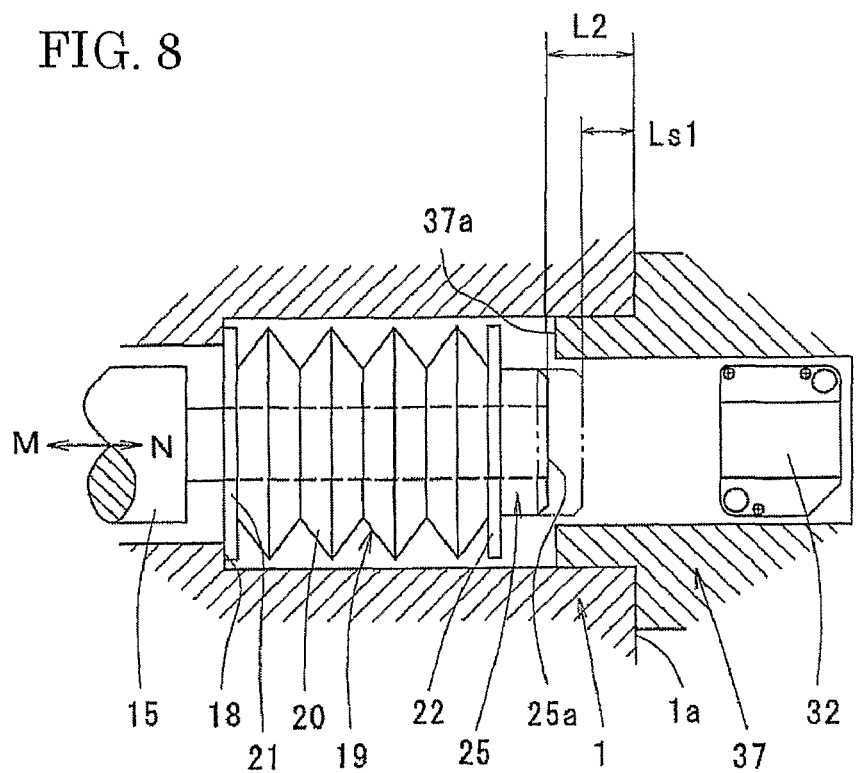
FIG. 8 is a partial cross-sectional view, similar to FIG. 5, diagrammatically illustrating a compressed state of the spring cartridge in a valve opening operation.

FIG. 8 shows a state of the spring cartridge 19 at the time when the valve opening operation is conducted and the spring cartridge 19 is compressed in the direction indicated by the arrow M after the spacer 21 has been brought into engagement with the shoulder 18. When the valve opening operation is started from the state where the spring cartridge 19 is in the first initial position, the spring cartridge 19 is brought into the state shown in FIG. 8 directly from the first initial position. When the valve opening operation is started from the state where the spring cartridge 19 is in the second initial position, the spring cartridge 19 is moved from the second initial position to the first initial position and then brought into the state shown in FIG. 8.

The position measurement using the laser sensor 32 will be described. The position measurement using the laser sensor 32 is carried out by measuring the distance from the laser sensor 32 to a measuring point. However, since the laser sensor 32 is secured on the side of the adapter 37, the position of the laser sensor 32 may be changed for reasons such as degradation of the packing 26 and manufacturing errors or assembly errors of the adapter 37. Thus, in this embodiment, a position which will not change, that is, a position on the end face 1a of the casing 1 is set as the reference point of the measurement. The measurements of the laser sensor 32 (that is, the distances from the laser sensor 32) are substituted for the distances from the reference point, and the substituted values are employed as measured distances. The measuring point on the side of the spring cartridge 19 is on the top face 25a of the nut 25 in the particularly illustrated embodiment as described before.

The distance between the measuring point on the top face 25a of the nut 25 and the reference point on the end face 1a of the casing 1 measured when the spring cartridge 19 is in the first initial position shown in FIG. 5 will be hereinafter referred to as "first initial value Ls1." The distance between the measuring point on the top face 25a of the nut 25 and the reference point on the end face 1a of the casing 1 measured when the spring cartridge 19 is in the second initial position shown in FIG. 6 will be hereinafter referred to as "second initial value Ls2."

There is a relation $\Delta L = Ls1 - Ls2$ among the play $\Delta L$ and the first and second initial values Ls1 and Ls2. In other words, the play $\Delta L$, which must be excluded when the measured values are substituted for reference amounts of compression in the basic data, can be obtained precisely by calculation when the first and second initial values Ls1 and Ls2 are measured.

The distance between the measuring point on the top face 25a of the nut 25 and the reference point on the end face 1a of the casing 1 measured when the spring cartridge 19 is in the state shown in FIG. 7 will be hereinafter referred to as "first measured value L1" (measured value when the valve closing operation is conducted) and the distance between the measuring point on the top face 25a of the nut 25 and the reference point on the end face 1a of the casing 1 measured when the spring cartridge 19 is in the state shown in FIG. 8 will be hereinafter referred to as "second measured value L2" (measured value when the valve opening operation is conducted).

The "real amount of compression" of the spring cartridge 19 necessary for the diagnosis of the motor-operated valve is calculated from the first and second measured values L1 and L2, the first and second initial values Ls1 and Ls2 and the play $\Delta L$. There is a relation "$\Delta L = Ls1 - Ls2$" among the first and second initial values Ls1 and Ls2 and the play $\Delta L$. Thus, the real amount of compression of the spring cartridge 19 when the valve closing operation is conducted (which will be hereinafter referred to as "first real amount of compression Lr1") is obtained according to the equation: $Lr1 = Ls1 - L1 - \Delta L = Ls2 - L1$, regardless of whether the spring cartridge 19 is in the first initial position or the second initial position when the valve closing operation has started. Also, the real amount of compression of the spring cartridge 19 when the valve opening operation is conducted (which will be hereinafter referred to as "second real amount of compression Lr2") is obtained according to the equation: $Lr2 = L2 - \Delta L - Ls2 = L2 - Ls1$, regardless of whether the spring cartridge 19 is in the first initial position or the second initial position when the valve opening operation has started.

The thus obtained first or second real amount of compression Lr1 or Lr2 is the real amount of compression of the spring cartridge 19 free from the influence of the play $\Delta L$. Thus, when the real amount of compression Lr1 or Lr2 is substituted for a reference amount of compression in the basic data, a real compression force generated at the reference amount of compression and a real torque corresponding to the real compression force can be easily obtained. Then, when a diagnosis of the motor-operated valve is made using the real torque, an accurate diagnosis can be made.

The torque measuring method and apparatus for a motor-operated valve according to the present invention will be described in detail.

First Embodiment

Figure 3:
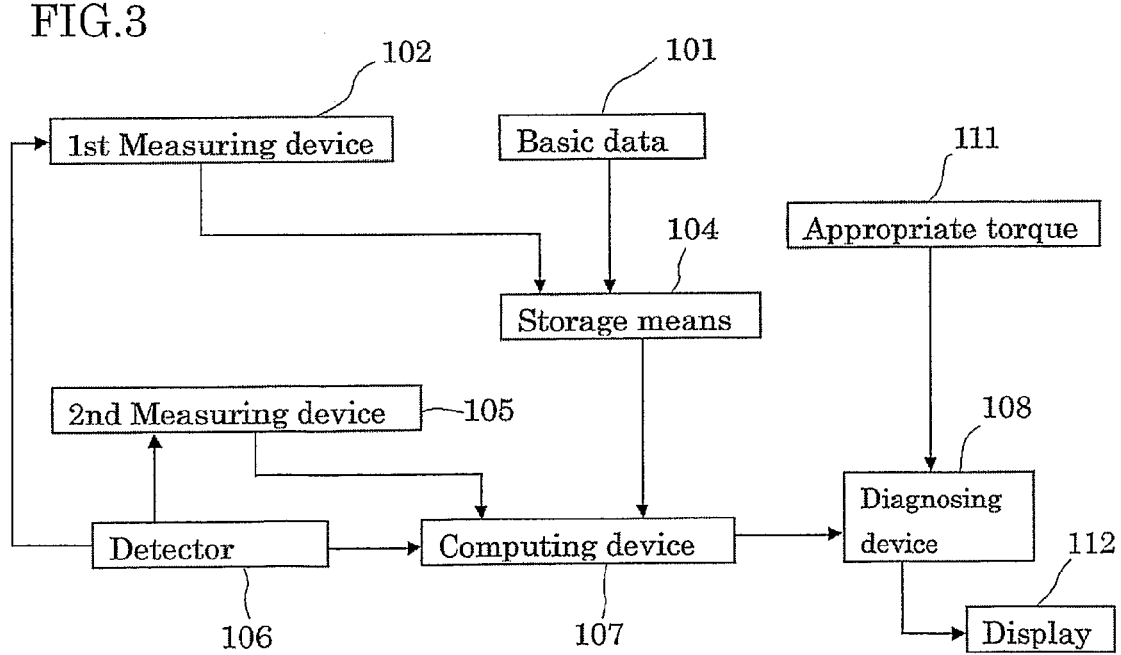
FIG. 3 is block diagram illustrating torque measuring method and apparatus for a motor-operated valve according to a first embodiment of the present invention.

FIG. 3 is a functional block diagram of the torque measuring method and apparatus according to the first embodiment of the present invention. The torque measuring apparatus has a basic data acquisition device 101, a first, distance measuring device 102, a storage means 104, a second, distance measuring device 105, a valve operating direction detector 106, a computing device 107, a diagnosing device 108, an appropriate torque storage means 111, and a display device 112.

The basic data acquisition device 101 acquires the basic data (see Table 1). More specifically, the basic data acquisition device 101 obtains the reference amounts of compression La1 to Lan and the reference compression forces F1 to Fn by measurements, obtains the reference torques T1 to Tn corresponding to the reference compression forces F1 to Fn, respectively, and outputs the data to the storage means 104, which will be described later. In this embodiment, the reference amounts of compression and the reference compression forces are measured when the spring cartridge 19 has been incorporated in the motor-operated valve.

The first, distance measuring device 102, which has the laser sensor 32 as a constituent component, measures the first and second initial values Ls1 and Ls2 and outputs them to the storage means 104, which will be described later.

The storage means 104 receives and stores the basic data (the reference amounts of compression La1 to Lan, the reference compression forces F1 to Fn and the reference torques T1 to Tn) outputted from the basic data acquisition device 101 and the first and second initial values Ls1 and Ls2 outputted from the first, distance measuring device 102, and outputs them as needed to the computing device 107, which will be described later.

In the actual torque measurement conducted with the spring cartridge 19 being mounted on the motor-operated valve, the second, distance measuring device 105 measures the distance between the measuring point on the top face 25a of the nut 25 and the reference point on the end face 1a of the casing 1 when the valve closing operation is conducted and when the valve opening operation is conducted to obtain the first and second measured values L1 and L2 and outputs them to the computing device 107.

The detector 106 detects whether the valve closing operation is conducted or the valve opening operation is conducted when the first and second distance measuring devices 102 and 105 conduct the measurements, and outputs the result of the detection, as an operation direction signal, to each of the first and second distance measuring devices 102 and 105 and the computing device 107. The detector 106 may be a device which detects the rotational direction of the motor and outputs the operation direction signal. For example, the detector 106 may be configured to receive a signal indicative of switching the rotating direction of the motor from switching means for switching the rotating direction of the motor 10. Alternatively, the detector may be a device which outputs the operation direction signal by manual operation.

The computing device 107 receives the reference amounts of compression La1 to Lan, the reference compression force F1 to Fn, the reference torques T1 to Tn, and the first and second initial values Ls1 and Ls2 from the storage means 104, the first and second measured values L1 and L2 from the second, distance measuring device 105, and an operation direction signal indicating the valve operating direction from the detector 106. When the valve closing operation is conducted, the computing device 107 obtains an absolute value of a difference between the first measured value L1 and the second initial value Ls2 as a first real amount of compression Lr1. When the valve opening operation is conducted, the computing device 107 obtains an absolute value of a difference between the second measured value L2 and the first initial value Ls1 as a second real amount of compression Lr2. Then, the computing device 107 substitutes the first or second real amount of compression Lr1 or Lr2 for one of the reference amounts of compression La1 to Lan, obtains one of the reference compression forces F1 to Fn corresponding to the reference amount of compression, obtains one of the reference torques T1 to Tn corresponding to the reference compression force as the real torque, and optionally outputs the real torque to the diagnosing device 108, which will be described later.

The diagnosing device is electrically connected to the computing device for diagnosing torque-related conditions of the motor-operated valve using the real torque. The diagnosing device 108 receives the real torque from the computing device 107 and an appropriate torque determined in advance for each diagnosis item and stored in the appropriate torque storage means 111 and compares them to diagnose the appropriateness of the real torque.

Figure 9:
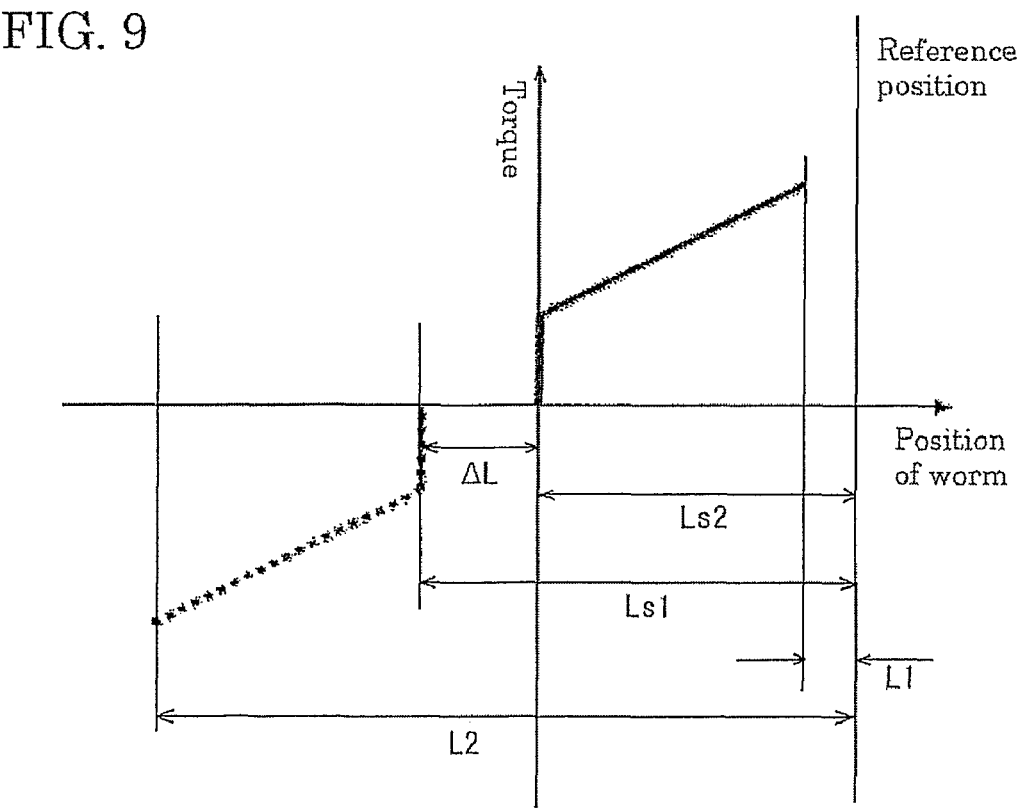
FIG. 9 is an example of a torque curve explanatory of the method and apparatus according to the present invention.

The result of the diagnosis may be displayed on the display device 112 as needed. Thus, when the operator adjusts the torque switch based on the result of the diagnosis, the motor-operated valve can be always used under proper operating conditions and the reliability and the service life of the motor-operated valve can be improved. A torque curve may be also displayed in relation to the first and second initial values Ls1 and Ls2, the first and second measured values L1 and L2, and the play $\Delta L$ on the display device 112 as shown in FIG. 9. Since the existence of the play and the magnitude thereof can be realized easily and accurately from the torque curve, a more reliable diagnosis can be made.

Second Embodiment

Figure 4:
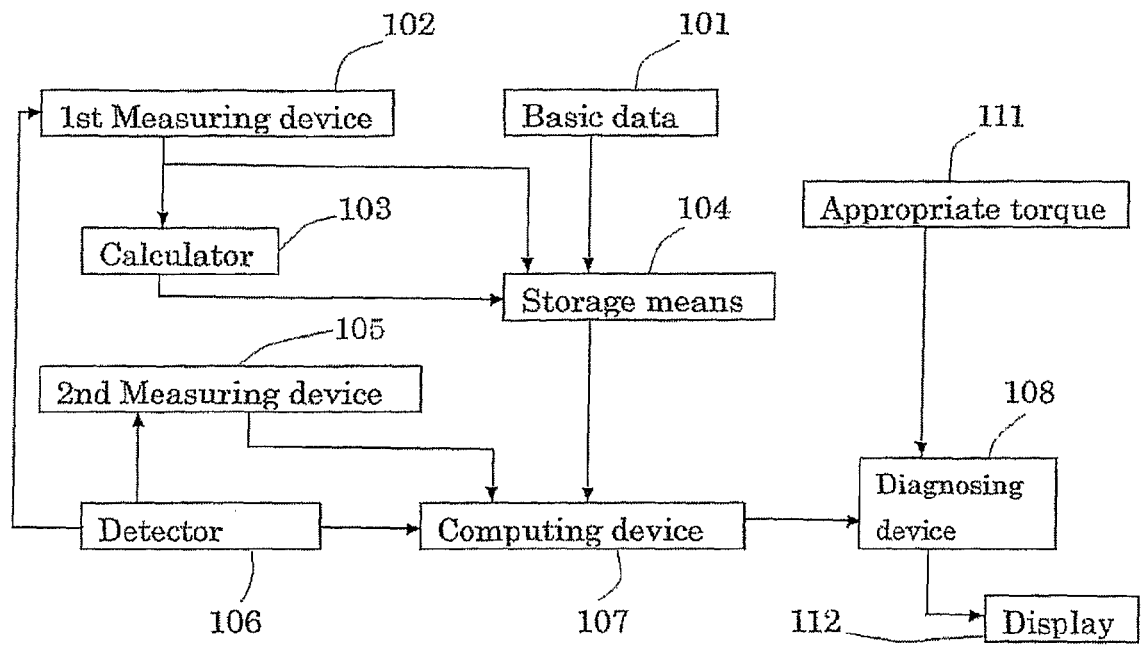
FIG. 4 is block diagram illustrating torque measuring method and apparatus for a motor-operated valve according to a second embodiment of the present invention.

FIG. 4 is a functional block diagram of the torque measuring method and apparatus according to the second embodiment. The torque measuring apparatus has a basic data acquisition device 101, a first, distance measuring device 102, a calculator 103, storage means 104, a second, distance measuring device 105, a detector 106, a computing device 107, a diagnosing device 108, an appropriate torque storage means 111, and a display device 112. The second embodiment differs from the first embodiment in that the second embodiment additionally includes a calculator 103 for calculating a play.

The basic data acquisition device 101 obtains the basic data (see Table 1). More specifically, the basic data acquisition device 101 obtains the reference amounts of compression La1 to Lan and the reference compression forces F1 to Fn by measurements, obtains the reference torques T1 to Tn corresponding to the reference compression forces F1 to Fn, respectively, and outputs the data to the storage means 104.

The first, distance measuring device 102, which has the laser sensor 32 as a constituent component, measures the first and second initial values Ls1 and Ls2 and outputs them to the calculator 103 and the storage means 104, which will be described later.

The calculator 103 receives the first and second initial values Ls1 and Ls2 from the first, distance measuring device 102 and obtains the play $\Delta L$ by calculating the difference between the first and second initial values Ls1 and Ls2, and outputs the play $\Delta L$ to the storage means 104.

The storage means 104 receives and stores the basic data (the reference amounts of compression La1 to Lan, the reference compression forces F1 to Fn and the reference torques T1 to Tn) outputted from the basic data acquisition device 101, the first and second initial values Ls1 and Ls2 outputted from the first, distance measuring device 102, and the play $\Delta L$ outputted from the calculator 103, and outputs them as needed to the computing device 107.

The second, distance measuring device 105 measures the distance between the measuring point (that is, the top face 25a of the nut 25) and the reference point (that is, the end face 1a of the casing 1) when the valve closing operation is conducted and when the valve opening operation is conducted to obtain the first and second measured values L1 and L2 and outputs them to the computing device 107.

The detector 106 detects whether the valve closing operation is conducted or the valve opening operation is conducted when the first and second distance measuring devices 102 and 105 conduct the measurements, and outputs the result of the detection, as an operation direction signal, to each of the first and second distance measuring devices 102 and 105 and the computing device 107. The detector 106 may be a device which detects the rotational direction of the motor and outputs the operation direction signal. For example, the detector 106 may be configured to receive a signal indicative of switching the rotating direction of the motor from switching means for switching the rotating direction of the motor 10. Alternatively, the detector may be a device which outputs the operation direction signal by manual operation.

Figure 11:
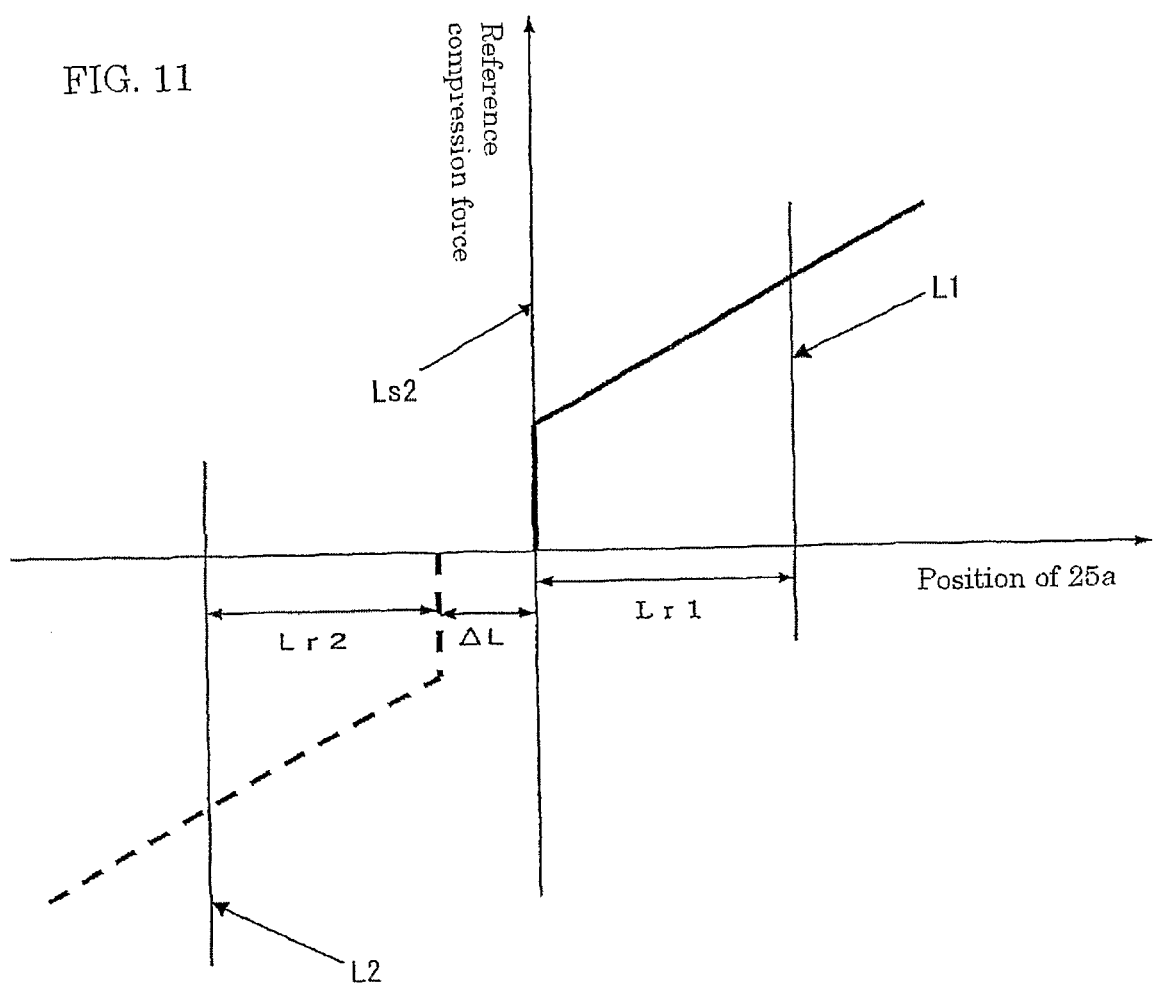
FIG. 11 is a graph explanatory of a method for acquiring a real amount of compression according to one embodiment of the present invention.

The computing device 107 receives the reference amounts of compression La1 to Lan, the reference compression force F1 to Fn, the reference torques T1 to Tn, the first and second initial values Ls1 and Ls2, and the play $\Delta L$ from the storage means 104, the first and second measured values L1 and L2 from the second, distance measuring device 105, and a signal indicating the valve operating direction from the detector 106. When the valve closing operation is conducted, the computing device 107 employs the absolute value of the difference between the first measured value L1 and the second initial value Ls2 as a first real amount of compression Lr1 as shown in FIG. 11. When the valve opening operation is conducted, the computing device 107 employs the value obtained by subtracting the play $\Delta L$ from the absolute value of the difference between the second measured value L2 and the second initial value Ls2 as a second real amount of compression Lr2 as shown in FIG. 11.

Figure 12:
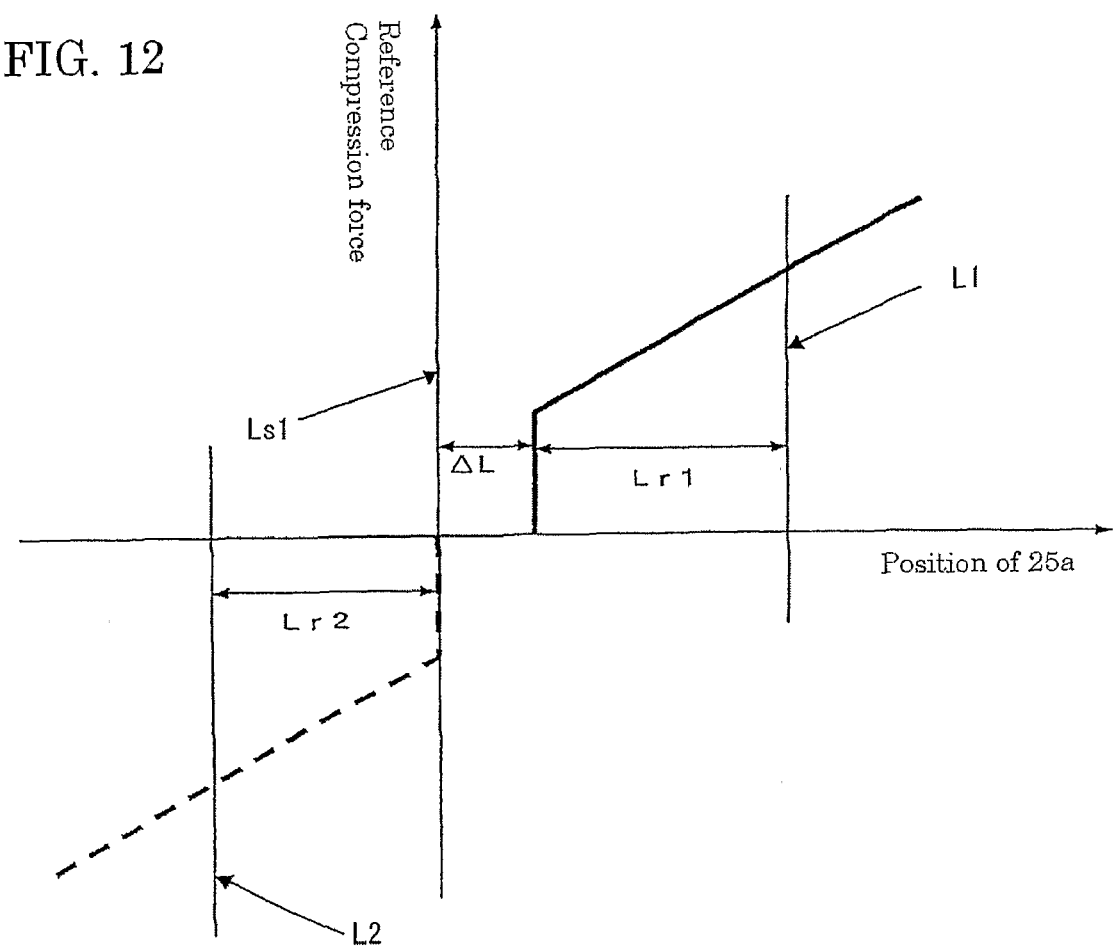
FIG. 12 is a graph explanatory of a method for acquiring a real amount of compression according to one embodiment of the present invention.
Figure 13:
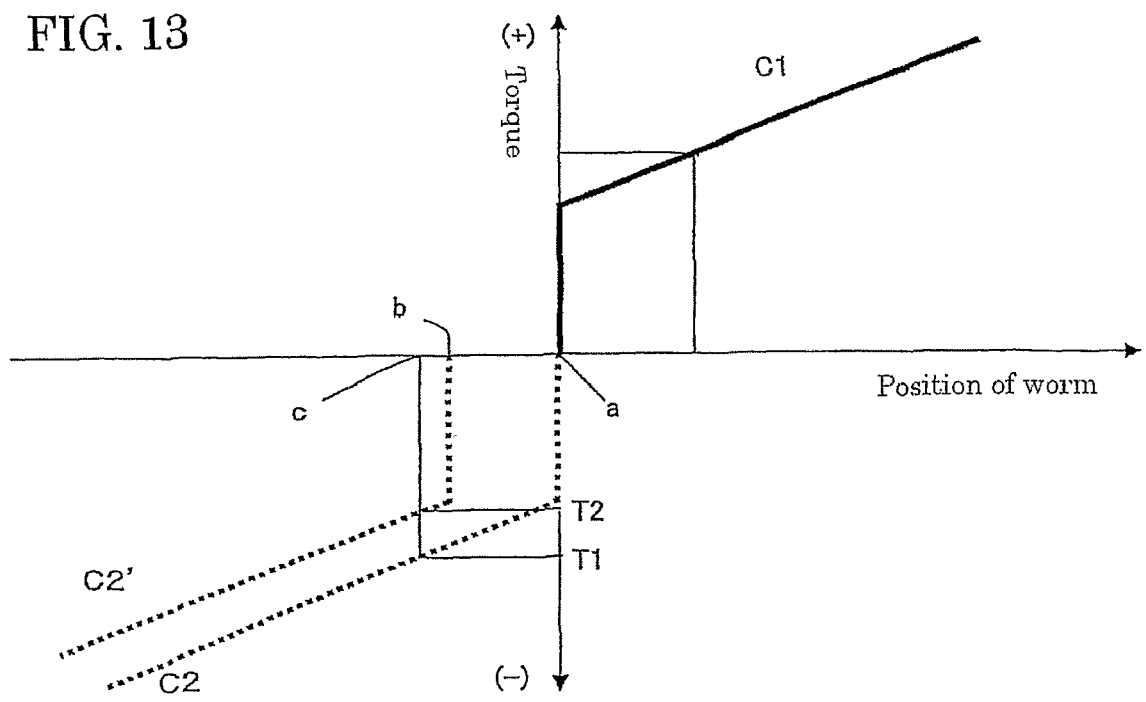
FIG. 13 is a graph showing a conventional method for acquiring a torque curve.

Alternately, when the valve closing operation is conducted, the computing device 107 employs the value obtained by subtracting the play ΔL from the absolute value of the difference between the first initial value Ls1 and the first measured value L1 as a first real amount of compression Lr1 as shown in FIG. 12. When the valve opening operation is conducted, the computing device 107 employs the absolute value of the difference between the second measured value L2 and the first initial value Ls1 as a second real amount of compression Lr2 as shown in FIG. 12. Then, the computing device 107 substitutes the first or second real amount of compression Lr1 or Lr2 for one of the reference amounts of compression La1 to Lan, obtains one of the reference compression forces F1 to Fn corresponding to the reference amount of compression, obtains one of the reference torques T1 to Tn corresponding to the reference compression force as the real torque, and optionally outputs the real torque to the diagnosing device 108, which will be described later. In FIGS. 11 and 12, the compression force in the valve closing operation is indicated as having plus values, while the compression force in the valve opening operation is indicated as having minus values.

The diagnosing device 108 receives the real torque from the computing device 107 and an appropriate torque determined in advance for each diagnosis item and stored in the appropriate torque storage means 111 and compares them to diagnose the appropriateness of the real torque.

The result of the diagnosis may be displayed on the display 112 as needed. Thus, when the operator adjusts the torque switch based on the result of the diagnosis, the motor-operated valve can be always used under proper operating conditions and the reliability and service life of the motor-operated valve can be improved. A torque curve may be also displayed in relation to the first and second initial values Ls1 and Ls2, the first and second measured values L1 and L2, and the play ΔL on the display device 112 as shown in FIG. 9. Since the existence of a play and the size thereof can be realized easily and accurately from the torque curve, a more reliable diagnosis can be made. Further, since the changes of the difference between the first and second initial values Ls1 and Ls2, that is, the play of the spring cartridge 19, over time can be monitored, a multidimensional diagnosis can be made.

The play attributed to the difference between the length of the spring cartridge 19 and the distance from the shoulder 18 of the casing 1 to the end face 37a of the adapter 37 is created and changed by the variations of clamping pressure applied to the packing 26 when the spring cartridge 19 or the adapter 37 is replaced. However, since such a play can be excluded when the computing device 107 obtains a real torque, reliable diagnosis and evaluation can be made regardless of the existence of the play.

Although the measurement of the spring properties of the belleville springs 20 (the reference amounts of compression and reference compression forces corresponding to the reference amounts of compression) is made when the spring cartridge 19 has been incorporated in the motor-operated valve in the above embodiments, the present invention is not limited thereto. The following methods can be employed.

One method is to measure the spring properties of the belleville springs 20 when the spring cartridge 19 has been incorporated in the motor-operated valve and the motor-operated valve is not operating. In this case, a spring pressing mechanism having a pressing function and a position detection function is attached in place of the sensor unit 30 or the cap 39. Then, the compression mechanism compresses the belleville springs 20 and measures the amount of compression. An advantage of this method is that since the spring cartridge 19 does not have to be detached although the sensor unit 30 has to be removed, the measurement can be conducted easily as compared with the case in which the spring cartridge 19 has to be detached.

Another method is to measure the spring properties of the belleville springs 20 when the spring cartridge has detached from the motor-operated valve. An advantage of this method is that the measurement can be easily performed with high accuracy. In this case, since the results of measurement do not exclude an influence of a play of the spring cartridge 19, it is necessary to exclude the play as in the case with the above embodiments.

Illustrative of the torque-related conditions of motor-operated valves to be diagnosed are as follows:
(1) whether an appropriate retention torque is exerted on the valve disc when it is in the full open or close position;
(2) whether the setting of a torque switch for automatically stopping the motor when a predetermined amount of torque is applied to the valve disc is appropriate;
(3) how much the valve driving mechanism and other parts are worn;
(4) whether the preload is within a predetermined range; and
(5) whether the valve disc is operated with an appropriate torque.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

The invention claimed is:

1. A torque measuring method for a motor-operated valve comprising a valve driving mechanism operable to open and close the valve, an axially extending and axially displaceable worm operatively connected to the valve driving mechanism to operate the valve driving mechanism by driving of the motor, and a spring cartridge having a plurality of axially arranged belleville springs applied with a preload so that the belleville springs operate as a unit, said spring cartridge being disposed coaxially with the worm for compression by axial displacement of the worm, so that a torque proportional to a compression of the belleville springs is applied to the driving mechanism upon an axial displacement of the worm, said method comprising the steps of:
   (a) obtaining basic data representing a relationship between reference amounts of compression of the belleville springs of the spring cartridge and corresponding reference torques exerted by the reference amounts of compression;
   (b) measuring an axial displacement of the worm or the spring cartridge and acquiring, from the thus obtained axial displacement of the worm or the spring cartridge, a real amount of compression of the belleville springs in which an influence of a play in the axial direction of the spring cartridge has been removed; and
   (c) substituting said real amount of compression of the belleville springs for the reference amount of compression of the belleville springs of said basic data to acquire a real torque corresponding to said real amount of compression, wherein step (b) comprises:
   measuring a first initial value representing a distance in the axial direction between a measuring point on the spring cartridge side and a reference point when the spring cartridge is located at a first initial position at which the spring cartridge has stopped moving when the valve is operated in the valve opening direction;

measuring a second initial value representing a distance in the axial direction between said measuring point and said reference point when the spring cartridge is located at a second initial position at which the spring cartridge has stopped moving when the valve is operated in the valve closing direction;

measuring a first measured value representing a distance in the axial direction between said measuring point and said reference point when the valve closing operation is conducted;

measuring a second measured value representing a distance in the axial direction between said measuring point and said reference point when the valve opening operation is conducted; and detecting the direction of the operation of the valve and acquiring said real amount of compression of the belleville springs, said real amount of compression equals an absolute value of a difference between said first measured value and said second initial value when the valve closing operation is conducted or an absolute value of a difference between said second measured value and said first initial value when the valve opening operation is conducted.

2. A torque measuring method as recited in claim 1, wherein said reference point is on a casing on which the motor-operated valve is secured.

3. A torque measuring method as recited in claim 1, wherein, in step (a), said basic data is obtained with the spring cartridge being dethched from said motor-operated valve.

4. A torque measuring method as recited in claim 1, wherein, in step (a), said basic data is obtained with the spring cartridge being mounted on said motor-operated valve.

5. A torque measuring method as recited in claim 4, wherein, in step (a), said basic data is obtained while maintaining the motor-operated valve in an inoperative state.

6. A torque measuring method as recited in claim 4, wherein, in step (a), said basic data is obtained while maintaining the motor-operated valve in an operative state.

7. A torque measuring method as recited in claim 1, further comprising using said real torque for diagnosing torque-related conditions of the motor-operated valve.

8. A torque measuring method for a motor-operated valve comprising a valve driving mechanism operable to open and close the valve, an axially extending and axially displaceable worm operatively connected to the valve driving mechanism to operate the valve driving mechanism by driving of the motor, and a spring cartridge having a plurality of axially arranged belleville springs applied with a preload so that the belleville springs operate as a unit, said spring cartridge being disposed coaxially with the worm for compression by axial displacement of the worm, so that a torque proportional to a compression of the belleville springs is applied to the driving mechanism upon an axial displacement of the worm, said method comprising the steps of:

(a) obtaining basic data representing a relationship between reference amounts of compression of the belleville springs of the spring cartridge and corresponding reference torques exerted by the reference amounts of compression;

(b) measuring an axial displacement of the worm or the spring cartridge and acquiring, from the thus obtained axial displacement of the worm or the spring cartridge, a real amount of compression of the belleville springs in which an influence of a play in the axial direction of the spring cartridge has been removed; and (c) substituting said real amount of compression of the belleville springs for the reference amount of compression of the belleville springs of said basic data to acquire a real torque corresponding to said real amount of compression, wherein step (b) comprises:

measuring a first initial value representing a distance in the axial direction between a measuring point on the spring cartridge side and a reference point when the spring cartridge is located at a first initial position at which the spring cartridge has stopped moving when the valve is operated in the valve opening direction;

measuring a second initial value representing a distance in the axial direction between said measuring point and said reference point when the spring cartridge is located at a second initial position at which the spring cartridge has stopped moving when the valve is operated in the valve closing direction;

calculating said play, said play equals an absolute value of a difference between said first initial value and said second initial value;

measuring a first measured value representing a distance in the axial direction between said measuring point and said reference point when the valve closing operation is conducted;

measuring a second measured value representing a distance in the axial direction between said measuring point and said reference point when the valve opening operation is conducted; and detecting the direction of the operation of the valve and acquiring said real amount of compression of the belleville springs, said real amount of compression equals an absolute value of a difference between said first measured value and said second initial value or a value obtained by subtracting said play from an absolute value of a difference between said first initial value and said first measured value when the valve closing operation is conducted, or equals a value obtained by subtracting said play from an absolute value of a difference between said second initial value and said second measured value or an absolute value of a difference between said second measured value and said first initial value when the valve opening operation is conducted.

9. A torque measuring method as recited in claim 8, wherein, in step (a), said basic data is obtained with the spring cartridge being detached from said motor-operated valve.

10. A torque measuring method as recited in claim 8, wherein, in step (a), said basic data is obtained with the spring cartridge being mounted on said motor-operated valve.

11. A torque measuring method as recited in claim 10, wherein, in step (a), said basic data is obtained while maintaining the motor-operated valve in an inoperative state.

12. A torque measuring method as recited in claim 10, wherein, in step (a), said basic data is obtained while maintaining the motor-operated valve in an operative state.

13. A torque measuring method as recited in claim 8, wherein said reference point is on a casing on which the motor-operated valve is secured.

14. A torque measuring method as recited in claim 8, further comprising using said real torque for diagnosing torque-related conditions of the motor-operated valve.

15. A torque measuring apparatus for a motor-operated valve comprising a valve driving mechanism operable to open and close the valve, an axially extending and axially displaceable worm operatively connected to the valve driving mechanism to operate the valve driving mechanism by driving of the motor, and a spring cartridge having a plurality of axially arranged belleville springs applied with a predetermined load so that the belleville springs operate as a unit, said spring cartridge being disposed coaxially with the worm for compression by the worm, so that a torque proportional to a compression of the belleville springs is applied to the driving mechanism upon displacement of the worm, said apparatus comprising:

an acquisition device for acquiring basic data representing a relationship between reference amounts of compression of the belleville springs of the spring cartridge and corresponding reference torques exerted by the reference amounts of compression;

a real compression acquisition device for measuring an axial displacement of the worm or the spring cartridge and acquiring, from the thus obtained axial displacement of the worm or the spring cartridge, a real amount of compression of the belleville springs in which an influence of a play in the axial direction of the spring cartridge has been removed; and a computing device for acquiring a real torque corresponding to said real amount of compression by substituting said real amount of compression of the belleville springs for the reference amount of compression of the belleville springs of said basic data, wherein said real compression acquisition device comprises:

a first, distance measuring device for measuring a first initial value representing a distance in the axial direction between a measuring point on the spring cartridge side and a reference point when the spring cartridge is located at a first initial position at which the spring cartridge has stopped moving when the valve is operated in the valve opening direction, and for measuring a second initial value representing a distance in the axial direction between said measuring point and said reference point when the spring cartridge is located at a second initial position at which the spring cartridge has stopped moving when the valve is operated in the valve closing direction;

a second, distance measuring deice for measuring a first measured value representing a distance in the axial direction between said measuring point and said reference point when the valve closing operation is conducted, and for measuring a second measured value representing a distance in the axial direction between said measuring point and said reference point when the valve opening operation is conducted;

a detector for detecting the direction of the operation of the valve; and a computing device for acquiring said real amount of compression of the belleville springs, said real amount of compression equals an absolute value of a difference between said first measured value and said second initial value when the valve closing operation is conducted or an absolute value of a difference between said second measured value and said first initial value when the valve opening operation is conducted.

16. A torque measuring apparatus as recited in claim 15, wherein said first and second distance measuring devices are common to each other.

17. A torque measuring apparatus as recited in claim 16, wherein said first and second distance measuring devices comprise a laser sensor configured to receive a laser beam reflected on said measuring point on said spring cartridge side to detect a distance from said laser sensor to said measuring point.

18. A torque measuring apparatus as recited in claim 17, wherein said laser sensor is oil-tightly separated from the spring cartridge by a transparent member such that the laser sensor receives the reflected laser beam through said transparent member.

19. A torque measuring apparatus as recited in claim 15, further comprising a diagnosing device electrically connected to said computing device for diagnosing torque-related conditions of the motor-operated valve using said real torque.

20. A torque measuring apparatus as recited in claim 19, further comprising a display device electrically connected to said diagnosing device for displaying a torque curve.

21. A torque measuring apparatus for a motor-operated valve comprising a valve driving mechanism operable to open and close the valve, an axially extending and axially displaceable worm operatively connected to the valve driving mechanism to operate the valve driving mechanism by driving of the motor, and a spring cartridge having a plurality of axially arranged belleville springs applied with a predetermined load so that the belleville springs operate as a unit, said spring, cartridge being disposed coaxially with the worm for compression by the worm, so that a torque proportional to a compression of the belleville springs is applied to the driving mechanism upon displacement of the worm, said apparatus comprising:

an acquisition device for acquiring basic data representing a relationship between reference amounts of compression of the belleville springs of the spring cartridge and corresponding reference torques exerted by the reference amounts of compression;

a real compression acquisition device for measuring an axial displacement of the worm or the spring cartridge and acquiring, from the thus obtained axial displacement of the worm or the spring cartridge, a real amount of compression of the belleville springs in which an influence of a play in the axial direction of the spring cartridge has been removed; and a computing device for acquiring a real torque corresponding to said real amount of compression by substituting said real amount of compression of the belleville springs for the reference amount of compression of the belleville springs of said basic data, wherein said measuring device comprises:

a first, distance measuring device for measuring a first initial value representing a distance in the axial direction between a measuring point on the spring cartridge and a reference point when the spring cartridge is located at a first initial position at which the spring cartridge has stopped moving when the valve is operated in the valve opening direction, and for measuring a second initial value representing a distance in the axial direction between said measuring point and said reference point when the spring cartridge is located at a second initial position where the spring cartridge stops moving when the valve is operated in the valve closing direction;

a calculator for calculating said play, said play equals an absolute value of a difference between said first initial value and said second initial value;

a second, distance measuring deice for measuring a first measured value representing a distance in the axial direction between said measuring point and said reference point when the valve closing operation is conducted, and for measuring a second measured value representing a distance in the axial direction between said measuring point and said reference point when the valve opening operation is conducted;

a detector for detecting the direction of the operation of the valve; and a computing device for acquiring said real amount of compression of the belleville springs, said real amount of compression equals a difference between said first measured value and said second initial value or a value obtained by subtracting said play from an absolute value of a difference between said first initial value and said first measured value when the valve closing operation is conducted, or equals a value obtained by subtracting said play from an absolute value of a difference between said second initial value and said second measured value or an absolute value of a difference between said second measured value and said first initial value when the valve opening operation is conducted.

22. A torque measuring apparatus as recited in claim 21, wherein said first and second distance measuring devices are common to each other.

23. A torque measuring apparatus as recited in claim 22, wherein said first and second distance measuring devices comprise a laser sensor configured to receive a laser beam reflected on said measuring point on said spring cartridge side to detect a distance from said laser sensor to said measuring point.

24. A torque measuring apparatus as recited in claim 23, wherein said laser sensor is oil-tightly separated from the spring cartridge by a transparent member such that the laser sensor receives the reflected laser beam through said transparent member.

25. A torque measuring apparatus as recited in claim 21, further comprising a diagnosing device electrically connected to said computing device for diagnosing torque-related conditions of the motor-operated valve using said real torque.

26. A torque measuring apparatus as recited in claim 25, further comprising a display device electrically connected to said diagnosing device for displaying a torque curve.

* * * * *